United States Patent
Di Trapani et al.

(10) Patent No.: US 10,883,685 B2
(45) Date of Patent: Jan. 5, 2021

(54) SUNLIGHT-BASED SUN IMITATING ILLUMINATION

(71) Applicant: CoeLux S.r.l., Lomazzo (IT)

(72) Inventors: Paolo Di Trapani, Cavallasca (IT); Davide Magatti, Capiago Intimiano (IT); Matteo Molteni, Cassina Rizzardi (IT)

(73) Assignee: CoeLux S.r.l., Lomazzo (IT)

( * ) Notice: Subject to any disclaimer, the term of this patent is extended or adjusted under 35 U.S.C. 154(b) by 0 days.

(21) Appl. No.: 16/487,676

(22) PCT Filed: Feb. 28, 2017

(86) PCT No.: PCT/EP2017/000272
§ 371 (c)(1),
(2) Date: Aug. 21, 2019

(87) PCT Pub. No.: WO2018/157902
PCT Pub. Date: Sep. 7, 2018

(65) Prior Publication Data
US 2020/0056754 A1 Feb. 20, 2020

(51) Int. Cl.
*F21S 11/00* (2006.01)
*F21S 19/00* (2006.01)
(Continued)

(52) U.S. Cl.
CPC .......... *F21S 11/007* (2013.01); *F21S 11/002* (2013.01); *F21S 19/005* (2013.01); *F21V 3/049* (2013.01);
(Continued)

(58) Field of Classification Search
CPC ...... F21S 11/007; F21S 11/002; F21S 19/005; F21V 5/008; F21V 9/02; F21V 14/08;
(Continued)

(56) References Cited

U.S. PATENT DOCUMENTS 4,152,752 A * 5/1979 Niemi .................. F21S 2/00
362/576
4,302,069 A * 11/1981 Niemi .................. F21S 2/00
385/46
(Continued)

FOREIGN PATENT DOCUMENTS

CN 203024056 U 6/2013
CN 104964242 A 10/2015
(Continued)

OTHER PUBLICATIONS

European International Searching Authority, International Search Report and Written Opinion, corresponding PCT Application No. PCT/EP2017/000272, dated Oct. 18, 2017, 13 pages total.
(Continued)

*Primary Examiner* — Bryon T Gyllstrom
(74) *Attorney, Agent, or Firm* — DiBerardino McGovern IP Group LLC

(57) ABSTRACT

A sunlight-based projector system (3) is disclosed for providing a direct light beam (5). The projector system (3) comprises a sunlight receiving unit (9) with a collector system (13), a plurality of optical fibers (15), and a plurality of fiber output channels (44). The collector system (13) collects natural outdoor light, and couples the collected light into the plurality of optical fibers (15). The projector system (3) comprises further a sunlight forming unit (11) with a plurality of optical collimator units (47) arranged in a two-dimensional array, wherein each optical collimator unit (47) receives the respective fiber output light (45) and comprises at least one optical collimator (49) for reducing the angular distribution width of the received divergent fiber output light (45). Output areas of the plurality of optical collimator units (47) form essentially a continuously extending large light-emitting face (53) of the sunlight forming unit (11) for emitting an essentially collimated light beam (5).

(Continued)

The generated direct light beam (5) may be used together with diffused light generating areal units to provide a sun-sky imitating lighting system with a sun-like appearance.

28 Claims, 11 Drawing Sheets

(51) Int. Cl.

| | |
|---|---|
| F21V 3/04 | (2018.01) |
| F21V 5/00 | (2018.01) |
| F21V 9/02 | (2018.01) |
| F21V 14/08 | (2006.01) |
| F21V 23/00 | (2015.01) |
| F21V 23/04 | (2006.01) |
| G02B 3/00 | (2006.01) |
| G02B 5/00 | (2006.01) |
| F21V 8/00 | (2006.01) |
| F21Y 113/13 | (2016.01) |
| F21Y 115/10 | (2016.01) |

(52) U.S. Cl.
CPC ............... *F21V 5/008* (2013.01); *F21V 9/02* (2013.01); *F21V 14/08* (2013.01); *F21V 23/003* (2013.01); *F21V 23/0464* (2013.01); *G02B 3/0056* (2013.01); *G02B 3/0062* (2013.01); *G02B 5/003* (2013.01); *G02B 6/0008* (2013.01); *F21Y 2113/13* (2016.08); *F21Y 2115/10* (2016.08); *G02B 2207/101* (2013.01)

(58) Field of Classification Search
CPC . F21V 23/003; F21V 23/0464; G02B 3/0056; G02B 3/0062; G02B 5/003; G02B 6/008
USPC .......................................................... 362/2
See application file for complete search history.

(56) References Cited

U.S. PATENT DOCUMENTS

| | | | | |
|---|---|---|---|---|
| 4,539,625 A * | 9/1985 | Bornstein | ................ | F21S 11/00 362/145 |
| 5,371,660 A * | 12/1994 | Levens | ..................... | F21V 7/28 362/552 |
| 6,234,640 B1 * | 5/2001 | Belfer | ................. | G02B 6/0008 362/308 |
| 2003/0147261 A1 * | 8/2003 | Babbitt | ................ | F21S 19/005 362/582 |
| 2004/0187908 A1 | 9/2004 | Muhs et al. | | |
| 2011/0044041 A1 * | 2/2011 | Jaster | .................... | F21S 19/005 362/249.02 |
| 2011/0141570 A1 * | 6/2011 | Rillie | ................. | G02B 19/0042 359/598 |
| 2012/0230020 A1 * | 9/2012 | Rillie | .................... | F21V 7/0025 362/147 |
| 2013/0083554 A1 * | 4/2013 | Jaster | .................... | F21S 19/005 362/555 |
| 2013/0135744 A1 * | 5/2013 | Jaster | .................... | G02B 17/00 359/597 |
| 2014/0160556 A1 * | 6/2014 | Jaster | ................. | G02B 19/0042 359/350 |
| 2016/0290597 A1 | 10/2016 | Jurik et al. | | |
| 2016/0298813 A1 | 10/2016 | Jurik et al. | | |
| 2018/0054159 A1 * | 2/2018 | Ahdoot | .................. | H02S 40/22 |
| 2019/0285247 A1 | 9/2019 | Usseglio Nanot et al. | | |
| 2019/0360661 A1 | 11/2019 | Di Trapani et al. | | |

FOREIGN PATENT DOCUMENTS

| | | |
|---|---|---|
| CN | 105222077 A | 1/2016 |
| CN | 105793765 A | 7/2016 |
| JP | 2013246980 A | 12/2013 |
| WO | 2008143586 A1 | 11/2008 |
| WO | 2009156347 A1 | 12/2009 |
| WO | 2009156348 A1 | 12/2009 |
| WO | 2012029004 A1 | 3/2012 |
| WO | 2012051625 A2 | 4/2012 |
| WO | 2014076656 A1 | 5/2014 |
| WO | 2015172794 A1 | 11/2015 |

OTHER PUBLICATIONS

European International Searching Authority, International Preliminary Report on Patentability, corresponding PCT Application No. PCT/EP2017/000272, dated Sep. 12, 2019, 8 pages total.

T.C. Grenfell et al., "Representation of a non-spherical ice particle by a collection of independent spheres for scattering and absorption of radiation," Journal of Geophysical Research, vol. 104, No. D24, pp. 31,697-31,709 (13 total pages), Dec. 27, 1999.

MS Mayhoub and DJ Carter, "Towards hybrid lighting systems: A review," Lighting Res. Technol., vol. 42, pp. 51-71, 2010.

Office Action from counterpart European Application No. 17715039.8, dated Jun. 8, 2020, 5 pages.

Office Action from counterpart Chinese Application No. 201780087523.6, dated Jul. 13, 2020, 14 pages total (with 7 pages of partial English translation).

* cited by examiner

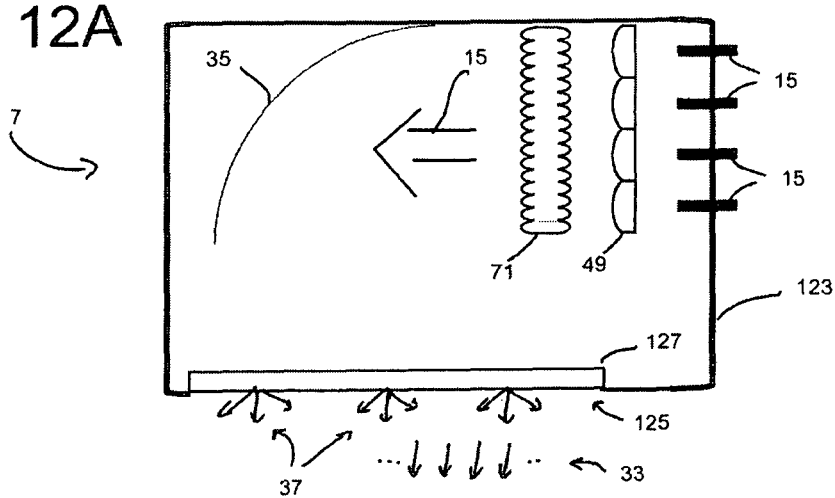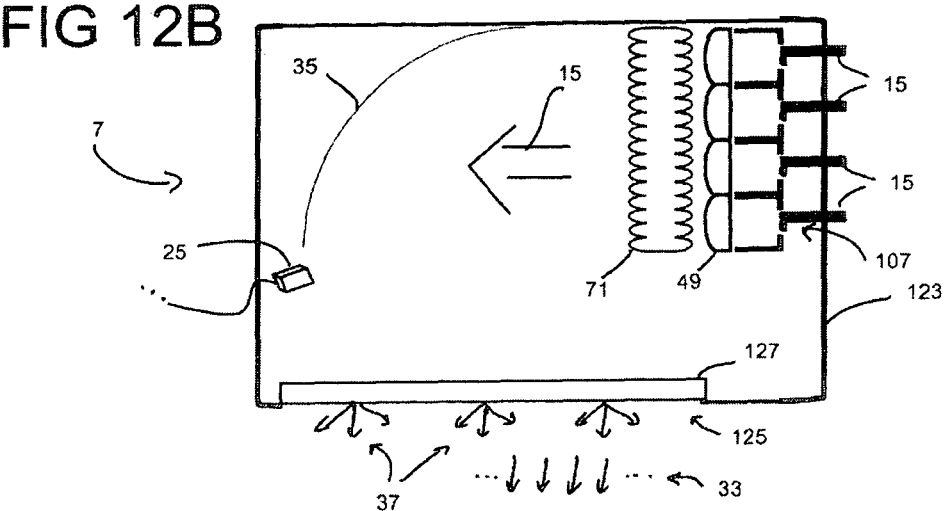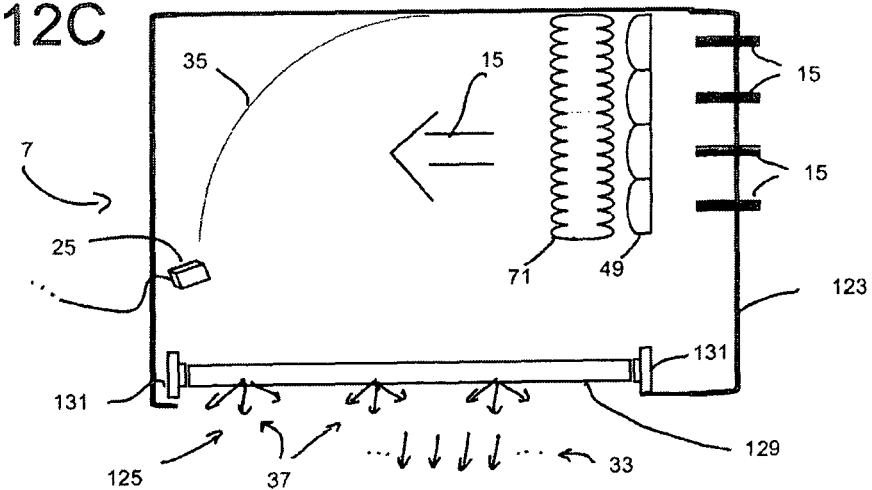

SUNLIGHT-BASED SUN IMITATING ILLUMINATION

TECHNICAL FIELD

The present disclosure relates generally to sunlight-based projector system and in particular to lighting systems using natural light for indoor illumination. Moreover, the present disclosure relates to controlling sunlight-based lighting systems and to supplementing sunlight-based lighting systems with artificial light.

BACKGROUND

Daylight-based illumination systems collect daylight and guide the collected light in particular by optic systems to luminaires that are distributed within a building. Accordingly, daylight-based illumination systems are energy efficient and allow the illumination of an indoor ambience with light having a natural visible spectrum.

Commercially available products include lens-based or reflector-based collector optics, a tracking system for following the sun-movement with the collector optics, a fiber-based light distribution system, and indoor light providing units. Daylight based illumination systems are disclosed, for example, in US 2004/187908 A1 and WO 2008/143586 A1. An example of non-patent disclosure is the publication "Towards hybrid lighting systems: A review", by M. S. Mayhoub et al., Lighting Res. Technol. 2010, 42: 51-71.

The collector optics is, for example, a parabolic reflector-based system using a parabolic primary mirror arrangement to focus the sunlight into a plurality of fibers, typically after a secondary reflection. Alternative embodiments use a plurality of lenses to collect the sunlight and to focus it into respective fibers. The tracking of the optimal light collecting conditions is usually based on sensor systems tracking the position of the sun and/or on geo-location systems, thereby optimizing the amount of collected light.

The light distribution system is usually based on fiber bundles receiving and guiding the collected light essentially without losses over significant distances. Losses are primarily generated by interfaces, each creating back scattering and Fresnel losses. Additional losses are created inside the fiber by light absorption. Accordingly, the number of interfaces are kept at a minimum value and the typical value of the length of the fibers is selected in the range of, for example, 10 m to 15 m.

The light providing unit often are simple passive emitters or they may be configured as hybrid luminaires. Passive emitters may use, for example, directly the divergent emission of the natural light from the fiber end and optionally diffuse the emitted natural light by respective diffusion optics. Passive emitters may alternatively comprise specifically designed scattering configurations provided at the fiber end or specific emitter configurations. Clearly, systems based on passive emitters only provide illumination when adequate natural light is collected by the collector optics. An example of a passive light providing unit is a spotlight configuration in which a single fiber bundle is guided to a spotlight mounting to locally emit natural light. Moreover, a plurality of such spotlight mountings may be positioned behind a common diffuser plate to achieve an areal light source. In either configuration, the output is diffuse light originating from a non-uniform source and having a broad sun-like wavelength spectrum.

In contrast, hybrid luminaires provide additionally the possibility to emit light from artificial light sources. In some installations, emitter configurations are used that emit artificially generated light next to the specific emitters for emitting the collected natural light. For example, light providing units are known that use side-emitting rods for natural light emission, whereby the rods are placed side by side to artificial light sources. Thus, hybrid luminaires can provide illumination independently from the natural light conditions.

It is an object of the present disclosure to use such daylight-based illumination systems not only to provide sun-like light in the wavelength spectrum but also in appearance, thereby enabling sun imitation, and in particular sun-sky imitating lighting systems. Moreover, it is an object to improve energy efficiency of sun-sky imitating lighting systems.

Thus, the present disclosure is directed, at least in part, to improving or overcoming one or more aspects of prior systems.

SUMMARY OF THE DISCLOSURE

In a first aspect, the present disclosure is directed to a sunlight-based projector system for providing a direct light beam, in particular for generating a sun-like appearance within a sun-sky imitating illumination system. The sunlight-based projector system comprises a sunlight receiving unit with a collector system, a plurality of optical fibers, and a plurality of fiber output channels. The collector system is configured for collecting natural outdoor light, and for coupling the collected light into the plurality of optical fibers. Each of the plurality of optical fibers comprises a fiber output end, and each fiber output channel comprises at least one fiber output end from which divergent fiber output light is emitted. The sunlight-based projector system comprises further a sunlight forming unit with a plurality of optical collimator units that are arranged in one- or two-dimensional array. Each optical collimator unit is associated with a respective fiber output channel to receive the respective fiber output light and comprises at least one optical collimator for reducing the angular distribution width of the received divergent fiber output light. Output areas of the plurality of optical collimator units form essentially a continuously extending large light-emitting face of the sunlight forming unit for emitting an essentially, and in particular sun-like, collimated light beam.

In another aspect, an illumination system is disclosed for generating a sun-like appearance within a sun-sky imitating illumination system. The illumination system comprises a sunlight-based projector system as mentioned above for generating a direct light component based on a direct light beam and a diffuse light generating unit (that in particular extends across the direct light beam) for generating a diffuse light component emitted across the direct light beam.

In another aspect, a sunlight-based projector system is disclosed that in particular provides a direct light beam usable for generating a sun-like appearance within a large area light output side of a sunlight-based illumination system. The sunlight-based projector system comprises a sunlight receiving unit with a collector system and a plurality of optical fibers. The collector system is configured for collecting natural outdoor light, and for coupling the collected light into the plurality of optical fibers. The sunlight-based projector system comprises an active light source unit configured for complementing the collected natural light with artificially generated light. The sunlight-based projector system comprises further a sunlight forming unit with at least one optical collimator unit. At least a subgroup of the optical collimator units is associated with at least one optical fiber, receives natural light and artificially generated light, and provides, based on the natural light and the artificially generated light, a collimated light beam. The sunlight-based projector system comprises further a chromaticity based control system comprising a chromaticity sensor for detecting the chromaticity of the collected natural outdoor light and/or the emitted collimated light. The chromaticity based control system comprises further a control unit for controlling the active light source unit in response to the detected chromaticity.

In particular with respect to sun-sky imitating illumination systems, it will become clear that the additional use of collected natural light will allow energy-efficient illumination of indoor environments, while still providing the specific infinite depth perception, at least an increased natural illumination condition. The increased energy efficiency will in particular be given during the day but applies also to morning and afternoon as well as (partly) cloudy days.

Further embodiments of the above aspects, are disclosed in the claims, which are incorporated herein by reference.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIGS. 12A to 12C are schematic drawings illustrating various configurations of illumination systems with additional diffuse light generation in the intermediate to far field;

DETAILED DESCRIPTION

Figure 1:
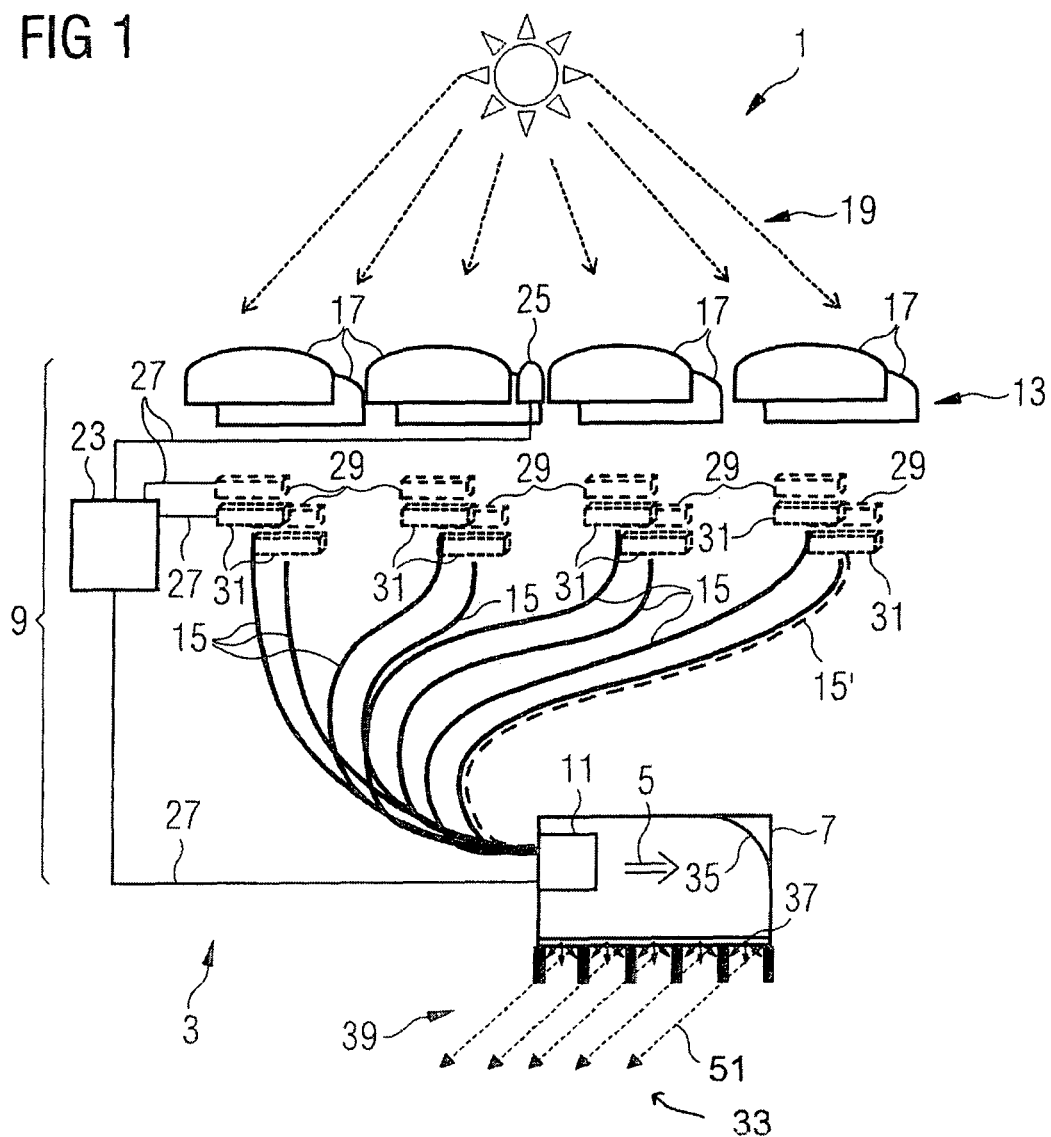
FIG. 1 is a schematic illustration of an exemplary illumination system with a sunlight-based projector system.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that collected daylight may be used to provide indoor natural lighting conditions. For that purpose, it was realized that light providing units of daylight-based illumination systems can be used to provide collimated sun-like light uniformly emitted from a large area. Specifically, it was realized that the emitted collimated light needs to be provided with a high contrast in the luminous intensity distribution (LID). Accordingly, the inventors propose to provide a plurality of optical collimator units that each receive light collected from a respective fiber output channel. Output areas of the plurality of optical collimator units essentially form a continuous light-emitting face, wherein the optical collimator units each are configured to output light uniformly from their output areas and the output light is sun-like collimated. Such a multichannel collimation enables direct light perception only from a restricted sun-like appearing area, when looking at the continuously extending large light-emitting face. Due to the sun-like collimation, an observer looking at the light-emitting face does not perceive any light originating from areas around the specific sun-like area.

To avoid any resolution of substructures given by the plurality of optical collimator units, the size of the output areas of the optical collimator units may be limited to, for example, 5 mm or less such as 3 mm, 2 mm, or even 1 mm in diameter.

To provide the desired collimation, the optical collimator units may comprise two or more collimating optical elements such as three optical elements comprising a field lens, a collimator lens, and a (in lateral size small scale) tandem lens arrangement. Alternatively or additionally to the tandem lens arrangement, a lens/pinhole configuration may be used to remove rays being emitted with a larger angle that otherwise would reduce the contrast of the LID.

For configurations, in which the continuous light-emitting face may be close to or even form the final output area of the lighting system, providing absorber structures within each optical collimator unit allows further ensuring the contrast between the area that should be perceived as the sun and those "sun surrounding" areas. Specifically, absorber structures may be configured such that light rays, which fall onto the light-emitting face from within a room, may either enter a fiber output end, or be absorbed at the surface of the absorber structures. Such a configuration will ensure that, on the perception side, only light from the fiber output end is perceived and no or strongly reduced reflections from the indoor environment are perceived when looking at the light-emitting face.

The inventors further realized that such a sunlight-based projector system can be used in combination with a large area diffuse light emitting source (herein also referred to as diffuse light generating unit) to create a sun-sky imitating lighting system. Specifically, the projector system generates the sun appearance while the large area source creates the sky appearance.

The large area diffuse light emitting source can be an independent artificial light source supplementing the (e.g. blue) sky appearance independently from the incident daylight on the collector system. Such an active configuration would be considered a hybrid illumination system that is at least partly independent from the amount of collected natural light.

In passive configurations, the large area diffuse light-emitting source can be based on Rayleigh-like scattering. Under Rayleigh-like scattering conditions, in particular short wavelength light will experience an enhanced scattering such that the direct light emitted from the light-emitting face will experience an enhanced diffuse scattering of blue light, forming the sky, while the directly transmitted light maintains collimated but experiences a slight red shift in chromaticity. Artificial lighting systems using Rayleigh-like scattering conditions allow simulating natural lighting. Exemplary embodiments of such lighting systems are disclosed in several applications such as WO 2009/156347 A1, WO 2009/156348 A1, and WO 2014/076656 A1, filed by the same applicants. The lighting systems disclosed therein use, for example, a light source producing visible light and a panel containing nanoparticles used in transmission or reflection. During operation of those lighting systems, the panel receives the light from the light source and acts as the Rayleigh diffuser, thereby diffusing incident light similarly to the earth atmosphere in clear-sky conditions. To provide further for a sun-like perception, the light sources may be used as disclosed in WO 2015/172794 A1 filed by the same applicants.

Due to the directionality of the direct light component originating from the large area diffuse light-emitting source, an observer will perceive a localized light source at a large, preferably infinite, distance. That localized light source is surrounded by a uniform appearing background, for example, in blue sky colors. Moreover, the position of the localized light source on the light-emitting face varies in dependence on the position of the observer, e.g. The "sun" position changes if the observer walks by the light-emitting face. Thereby, an infinite depth effect can be achieved that adds to the natural light spectrum provided for indoor illumination using the collected natural light.

The inventors further realized that the varying outside light conditions will result in respective variations of the indoor illumination not only for the large variations between morning and evening but also for short-term variations due to changing weather conditions such as clouds positioned before the sun. To stabilize indoor illumination while maintaining the type of perceived indoor illumination, the inventors propose herein to supplement not only (or alternatively) diffuse emitted light from secondary artificial light sources, but to supplement light into the beam path of the collected natural light. Accordingly, secondary artificial light sources may be provided at the input side of the optical fibers guiding the collected natural outdoor light, and/or secondary artificial light sources may be provided at the input side of the sunlight forming unit, specifically at the input side of the optical collimator units. The inventors propose various arrangements for matching the position of the artificial light sources next to the beam path of the natural collected light, as well as configurations that allow comparable beam parameters such as beam size and divergence. Proper positioning allows maintaining the use of optical collimator units associated with respective fiber output channels.

In such hybrid systems, variations in the collected natural light can be compensated by controlling the intensity as well as the spectrum of the input artificial light. Thereby, the appearance of the sun-sky imitating lighting system can be preserved. Moreover, not only short-term variations (due to cloud formation) but also all-day variations can be compensated and sufficient indoor elimination can be provided throughout the day.

It will be understood by the skilled person that hybrid systems may provide supplementing light sources for the direct light but also supplementing light sources for supporting the imitation of the diffuse skylight.

It will be understood that the supplementing light sources need to compensate for the changing outside conditions, but also maintain the specific desired type of appearance.

In general, such hybrid systems comprise control units that are designed to imitate—for any external sun condition (strong/weak; clear sky/overcast sky; morning/noon/evening)—the sun component and/or the sky component within the illuminated indoor environment.

In some hybrid configurations, the artificial light sources contributing to the sky component imitation are configured to emit light with a CCT larger than the sun while artificial light sources supplementing the collected natural light may be configured to emit light with a CCT comparable to the sunlight.

Control operations of the supplementing light sources may be based on detecting the outdoor and/or indoor light conditions. However, not only the intensity of collected light but also the chromaticity of the collected light influences the control of the artificial light sources. Accordingly, the control unit interacts with one or more detectors that provide information on the intensity as well as the color of the light that it is subject to the detector. It will be understood that, when knowing the physical parameters of the optical system, different positions of detectors can be used and, thus, different types of light information can be converted into each other to provide the required control parameters.

It will be acknowledged that, in addition to the compensation of outside conditions, hybrid configurations allow providing desired lighting conditions independent from the outside lighting conditions.

In the following, various embodiments of sunlight-based projector systems and exemplary installations in illumination systems are disclosed in connection with the figures. Specifically, FIGS. 1 and 3 illustrate exemplary installations of sunlight-based projector systems in illumination systems, FIGS. 4 to 8B illustrate exemplary optical collimator unit configurations, FIGS. 9 to 11 illustrate supplementing natural light with artificially generated light, and FIGS. 12A to 13C illustrate exemplary embodiments of luminaires for sunlight-based illumination systems.

Figure 3:
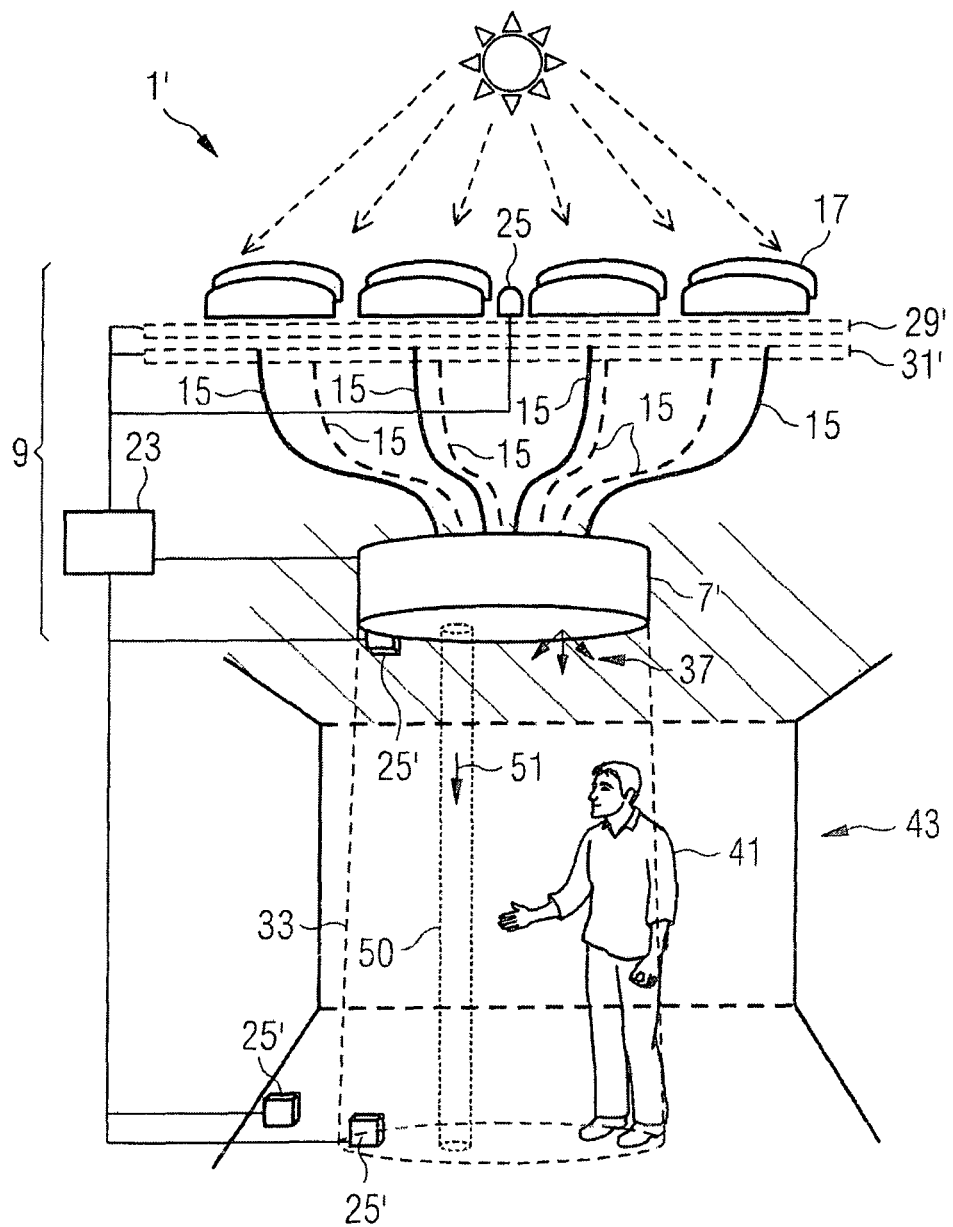
FIG. 3 is a further schematic illustration of an exemplary illumination system with a sunlight-based projector system.

In the embodiment shown in FIG. 1, emitted light is at least partly blocked while, in the embodiment of FIG. 3, the emitted light and an emission aperture may be seen by an observer. As will be explained, different configurations of optical collimator units may enable those embodiments.

Referring to FIG. 1, an illumination system 1 comprises a sunlight-based projector system 3 having a specific output of a direct light beam 5. Direct light beam 5 is used to provide sun-like illumination conditions with a luminaire 7.

Projector system 3 comprises a sunlight receiving unit 9 and a sunlight forming unit 11, sunlight receiving unit 9 is a system to collect the light of primarily the sun during the day and to guide the collected light to luminaire 7. Specifically, it comprises a collector system 13 and a plurality of optical fibers 15. Collector system 13 may be based on a plurality of reflective or refractive optical elements, such as mirrors or lenses 17, mounted, for example, outside a building, e.g. at the roof of the building to collect natural light. As illustrated in more detail in FIG. 2, lenses 17, for example, allow focusing incident sunlight 19 onto an inlet face at a fiber input end 15A of fiber 15 such that collected light 21 propagates by internal reflection within fiber 15 to an outlet face at a fiber output end 15B of fiber 15. In the exemplary embodiment of FIG. 1, each lens 17 is associated with a fiber 15.

In alternative configurations, each lens 17 may be associated with a group of fibers. For illustration, for one of the lenses 17, a second fiber is illustrated by a dashed line 15'. A fiber bundle coupling embodiment is further shown in FIG. 9A.

In general, sunlight receiving unit 9 provides a plurality of fiber output channels, wherein each fiber output channel comprises at least one fiber output end 15B.

Referring again to the exemplary embodiment of FIG. 1, a control unit 23 may be provided to take control measures when operating illumination system 1. For example, control unit 23 may receive information from a light sensor 25 positioned next to the plurality of lenses 17 via control lines 27. Accordingly, light sensor 25 receives information about the outdoor light conditions. In addition, additional elements such as a chromatic filter element 29 or a shutter element 31 may be provided between each lens 17 (collimator element) and each fiber input end 15A. Chromatic filter element 29 may be selectable from a group of filters and/or controllable in its transmission to stabilize the chromaticity and/or the total amount of sunlight provided to sunlight forming unit 11. Shutter element 31 may be controlled to stabilize the total amount of sunlight provided to sunlight forming unit 11. Those elements may be also connected to control unit 23 via control lines 27. In addition, control unit 23 is connected via another control line 27 to luminaire 7 and/or sunlight forming unit 11.

Illumination system 1, and in particular luminaire 7, is configured such that an observer will perceive a direct light component 33 that is based on direct light beam 5 provided by the projector system 3. For example, a mirror element 35 (e.g. focusing in one or two directions) may redirect direct light beam 5 in a specific manner. In addition, luminaire 7 may comprise an issue with lighted generator, such as a secondary light source and a light guide panel or a specific optical element, that generates diffuse light. The diffuse light is perceived by the observer as a diffuse light component 37. By providing direct light component 33 and diffuse light component 37 with specific optical properties, a sun-sky imitation may be achieved for an observer looking at luminaire 7.

In the exemplary embodiment of FIG. 1, luminaire 7 comprises further an appearance affecting optical system 39 as disclosed in more detail in, for example, the international PCT application PCT/EP2016/001944, entitled "Lighting System with Appearance Affecting Optical System", filed by the same applicants on 19 Nov. 2016, which is incorporated herein in its entirety by reference.

FIG. 3 illustrates another configuration of an illumination system 1' that is configured such that an observer 41 essentially will be able to directly look at the sunlight forming unit within luminaire 7'. For simplicity, similar components of illumination system 1' and illumination system 1 of FIG. 1 are identified by the same reference numerals. Respective components have similar functionality, which in particular applies to sunlight receiving unit 9.

Figure 2:
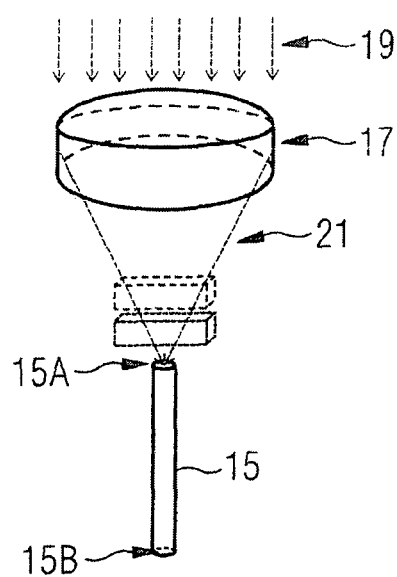
FIG. 2 is a schematic illustration of sunlight collection for a projector system.

To illustrate alternative configurations, a common filter 29' and a common shutter element 31' for all fibers of the plurality of optical fibers 15 are schematically indicated in FIG. 2 (instead of the plurality of elements in FIG. 1). Furthermore, with respect to light sensor 25, exemplary positions of indoor light sensors 25' within a room 43 may be used alternatively or in addition to outdoor light sensor 25. For example, an indoor light sensor 25' may be positioned within direct light component 33 or outside direct light component 33 but still within diffuse light component 37. Alternatively or additionally, an indoor light sensor 25' may be positioned at the ceiling next to luminaire 7. It will be understood that those indoor light sensors 25' may receive information on the sun-imitating light, and/or the sky-imitating light.

The light sensors may be configured to detect the chromaticity and/or the intensity of direct light component 33 and/or diffuse light component 37, as well as the general illumination level and chromaticity within room 43. It will be understood that such alternative configurations may—alone or in combination—be equally used within illumination system 1 of FIG. 1.

Similarly, the propagation direction of direct light component 33 may be selected in any desired orientation. While FIG. 1 illustrates an inclined propagation with respect to the vertical direction, FIG. 3 illustrates a vertical propagation direction of direct light component 33 as it would be essentially the case, for example, at noon outside.

Figure 4:
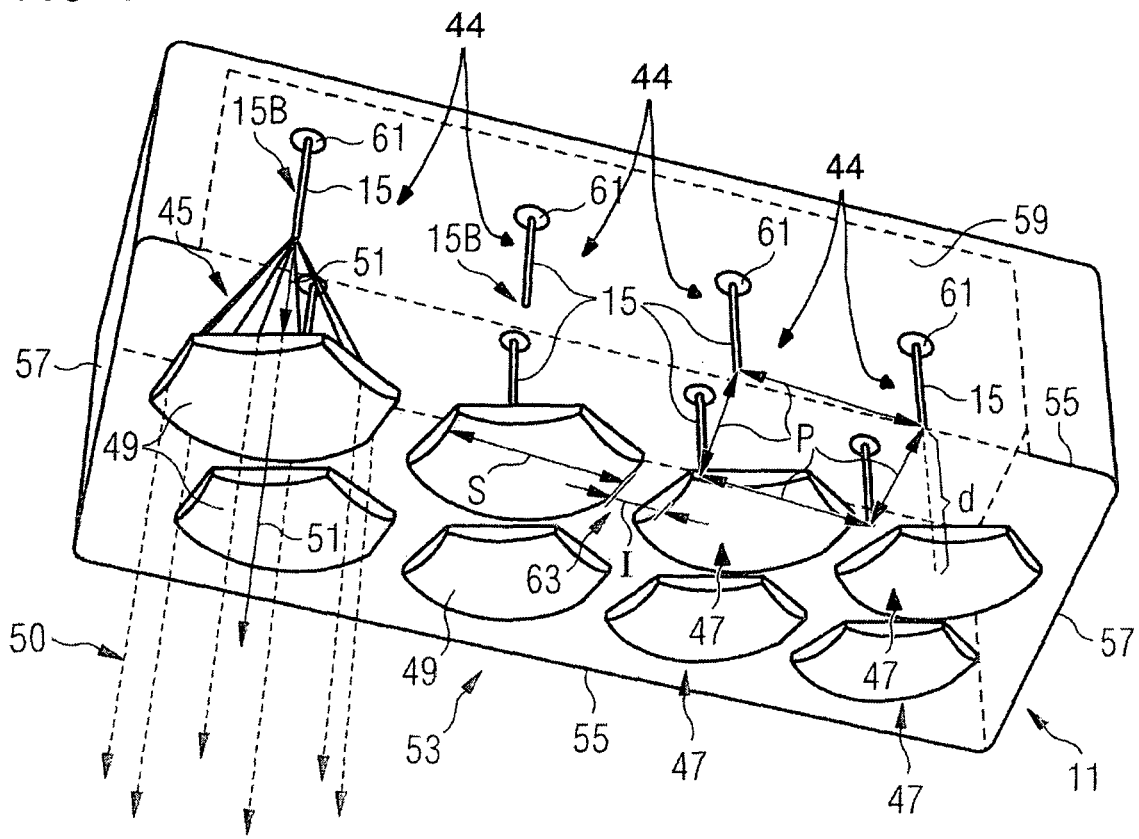
FIG. 4 is a schematic illustration of an exemplary refraction-based sunlight forming unit of a projector system.

Referring to FIG. 4, a schematic view of a sunlight forming unit 11 shows schematically a plurality of fiber output channels 44, each with at least one fiber output end. Fibers 15/fiber output channels 44 are arranged in a grid structure having a pitch distance P from each other. Each fiber output channel 44 emits the collected light as respective fiber output light 45 onto one of the plurality of optical collimator units 47. Exemplarily, FIG. 4 shows a two-dimensional array of eight optical collimator units 47 that each receive light from a respective fiber output channel 44. It will be understood that the number of rows and columns depends on the size of the optical collimator units as well as the large light-emitting face. Assuming a size of the light-emitting face in the range of 30 cm×60 cm and the size of the optical collimator units in the range of 3 cm, 200 collimator units and accordingly fiber output channels (that means at least 200 fibers) would be used in the sunlight forming unit.

In principle, also a single row of optical collimator units may allow the sun-like illumination. The plurality of optical collimator units form then a one-dimensional array with a cardinality C greater than 4, such as 8 or more, even 15 or more. A size Y of the output area of the optical collimator array along the direction of the array and the size X of the same output area of optical collimator array in the orthogonal direction, are in relation X=CY*eta, where eta is a constant in the range from, e.g., about 0.8 to about 1.2. Depending on the absolute lateral size of the optical collimator units and the perceived size of the sun (divergence and distance depending), only a section of the sun may be seen, i.e. never a complete sun because left and/or right portions of the sun may be cut off in the perception. Nevertheless, the "moving" sun across the light exiting surface may be perceived by an observer that is moving along the one-dimensional array.

In general, at least a subgroup of the fiber output channels 44 are essentially equally spaced with respect to each other and form the one or two-dimensional array. In FIG. 4, the exemplary two-dimensional array has the same pitch distance P as the grid structure of the plurality of fiber output channels 44. In other words, at least a subgroup of the optical collimator units 47 are essentially equally spaced with respect to each other, e.g., they are arranged in a grid-like manner.

Each collimator unit 47 comprises at least one light collimator such as lens 49 as an example of a refracting focusing element. Lens 49 has a lateral lens size S, i.e. the dimension of lens 49 in at least one direction orthogonal to a main propagation direction 51 of fiber output light 45, and is positioned essentially at a distance d from the respective fiber output end 15B that corresponds to the focusing length of lens 49. In general, distance d and lens size S are selected such that fiber output light 45 emitted from a respective fiber 15 falls essentially completely onto the entrance side of lens 49.

The emission characteristic of fiber output light 45 depends inter alia on the size of the fiber core. In general, the emission characteristic is primarily defined by its angular distribution and in particular the full width half maximum (FWHM) of the associated LID. For a rotational symmetric fiber core, the LID can also be assumed symmetric, at least after a certain propagation length. FWHM values of the LID may be in the angular range of 40° to 70° for common fiber configurations. It is noted that a FWHM with respect to polar angle coordinate of a mean intensity distribution of fiber output light 45 may be determined by averaging along the azimuthal coordinate y of the luminous intensity distribution. For comparison, a FWHM for Lambertian emission is 120°. As an example, for a lens size S of about 5 mm and a FWHM of 60°, a distance of about 5 mm may separate lens 49 from fiber output end 15B.

The focusing power of lens 49 is selected such that—with respect to fiber output light 45—the emission angle of collimated light 50 is reduced to a FWHM of, for example, below 10° such as 5° or 3°.

Exemplarily, FIG. 4 illustrates a hexagonal shape for lenses 49. Opposing side faces of the hexagonal shape define essentially lens size S. The maximum of lens size S is given by pitch distance P. The hexagonal shape of lenses 49 allows a close packing of lenses 49 in a honeycomb structure to form an essentially continuously extending large light-emitting face 53 of sunlight forming unit 11. Sunlight forming unit 11 comprises a housing in which the plurality of optical collimator units 47 are mounted together. The housing may be lightproof with the exception of light-emitting face 53 such that only the intentionally provided light, such as fiber output light 45 and optionally light of supplementing light sources, contributes to the output of projector system 3.

Continuously extending large light-emitting face 53 is delimited by the housing walls such as the lower ends of long sidewalls 55 and short sidewalls 57 of the housing of sunlight forming unit 11.

In the embodiment of FIG. 4, the housing comprises further a back wall 59 having mounting openings 61 for receiving fiber output ends 15B that are arranged at a regular pattern. At the housing's front, a light output opening or light transparent window allows the emission of the plurality of beam-like portions of collimated light 50. For further illustration, it is referred to FIG. 3, in which exemplarily collimated light 50 of a single optical collimator unit is illustrated together with its main propagation direction 51.

Depending on the use of collimated light 50, additional optical elements may be provided within the housing or may be attached to the housing to form a uniform intensity profile at a desired propagation distance, e.g. in the far field and/or the near field and/or an intermediate distance.

In general, an output area of an exemplary optical collimator unit 47 has a lateral size in the range from, for example, 0.2 cm2 to 200 cm2 such as at least 0.2 cm2, 0.3 cm2, 0.5 cm2 and up to 150 cm2, 100 cm2, 50 cm2, or 10 cm2.

In FIG. 4, an intermediate area 63 having a width I between neighboring optical collimator units is schematically illustrated between lenses 49. It is noted that that area is emphasized in FIG. 4 and is usually kept small as it constitutes a non-emitting transition area between optical collimator units 47. The non-emitting transition areas may cover, for example, at the most 60%, such as 40% and less or even 30% or less of the light-emitting face 53. An extent of the non-emitting transition area between output areas of neighboring optical collimator units 47 is usually at the most 0.5 such as 0.3 or 0.1 times the maximum lateral size of an output area. The non-emitting transition area may be caused, for example, by a mounting structure (not shown in FIG. 4) for optical collimator units 47, e.g. for mounting lenses 49 in a regular pattern. In addition or alternatively, the non-emitting transition area may be caused by an absorbing structure (not shown in FIG. 4) for optically separating neighboring optical collimator units 47.

In some embodiments, output areas of neighboring optical collimator units 47 may abut against each other such that there is essentially no intermediate area 63.

Figure 5:
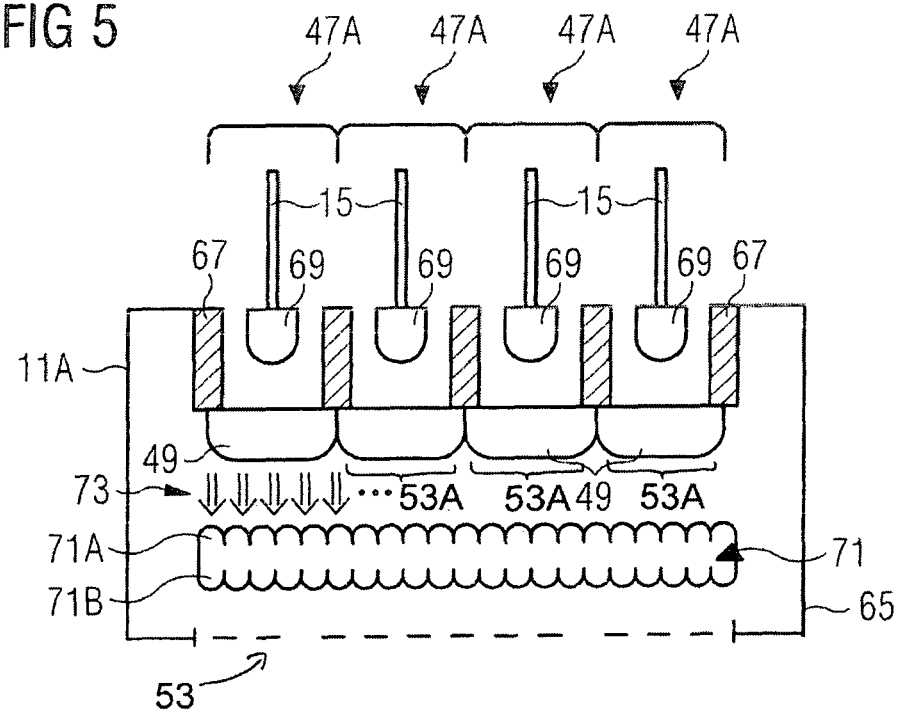
FIG. 5 is a schematic cross-sectional view of an embodiment of a sunlight forming unit.

FIG. 5 illustrates a cross-section of a sunlight forming unit 11A that may be used in a projector system and that is configured to provide a uniform collimated light beam in the intermediate field or in the far field. Within a housing 65 sunlight informing unit 11A, a plurality of optical collimator units 47A receive light from respective optical fibers 15. Each optical collimator unit 47A comprises absorbing side surfaces 67 of a mounting structure. The mounting structure is configured to mount lenses 49 side by side in a one- or two-dimensional arrangement. Between side surfaces 67, a light channel is formed through which light originating from a specific fiber 15 propagates and falls onto lens 49 such that light is emitted from an output area 53A associated with each optical collimator unit 47A.

In the specific embodiment of FIG. 5, each optical collimator unit 47A further comprises a field lens 69 as a primary focusing element that is positioned close to (for example on top of) that respective fiber output end of an associated fiber 15. Each field lens 69 pre-collimates fiber output light onto lens 49. Lenses 49 are positioned at about a focal length distance from respective fiber output ends' virtual images through field lenses 69.

Within housing 65, a (beam) homogenizing unit 71 is mounted downstream of lenses 49 and light-emitting face 53. Homogenizing unit 71 is configured to interact with the plurality of portions of collimated light 50. Specifically, homogenizing unit 71 is configured as a two-dimensional microlens array that extends across collimated light 50 of each collimator unit 47A.

Figure 6A:
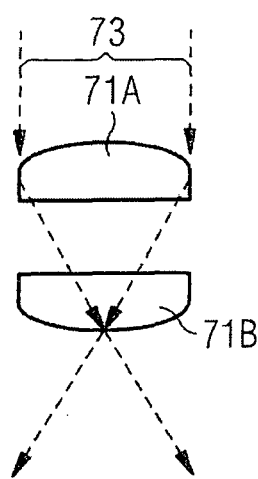
FIGS. 6A to 6C are schematic drawings illustrating the function of a far field homogenizing unit.
Figure 6B:
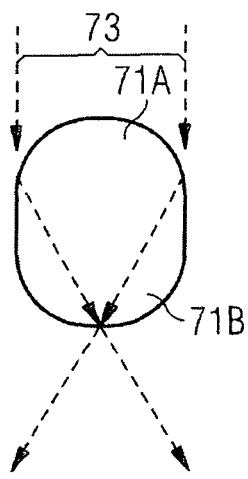

Homogenizing unit 71 comprises, for example, a plurality of pairs of microlens elements 71A, 71B in tandem configuration. The size of the microlens elements 71A, 71B is significantly smaller than the size of lenses 49, and in particular smaller than the size of an optical collimator unit 47. For example, at least ten microlens elements are associated with a light collimator such as lens 49. In some embodiments, the microlens elements have a lateral size in the range from 3 mm to 0.1 mm such as 3 mm, 2 mm, 1 mm, 0.5 mm or 0.2 mm. Exemplary embodiments are illustrated in FIGS. 6A and 6B, where the embodiment of FIG. 6A shows two separate microlenses forming a pair, and the embodiment of FIG. 6B has the two separate microlenses combined in a single optical component.

Figure 6C:
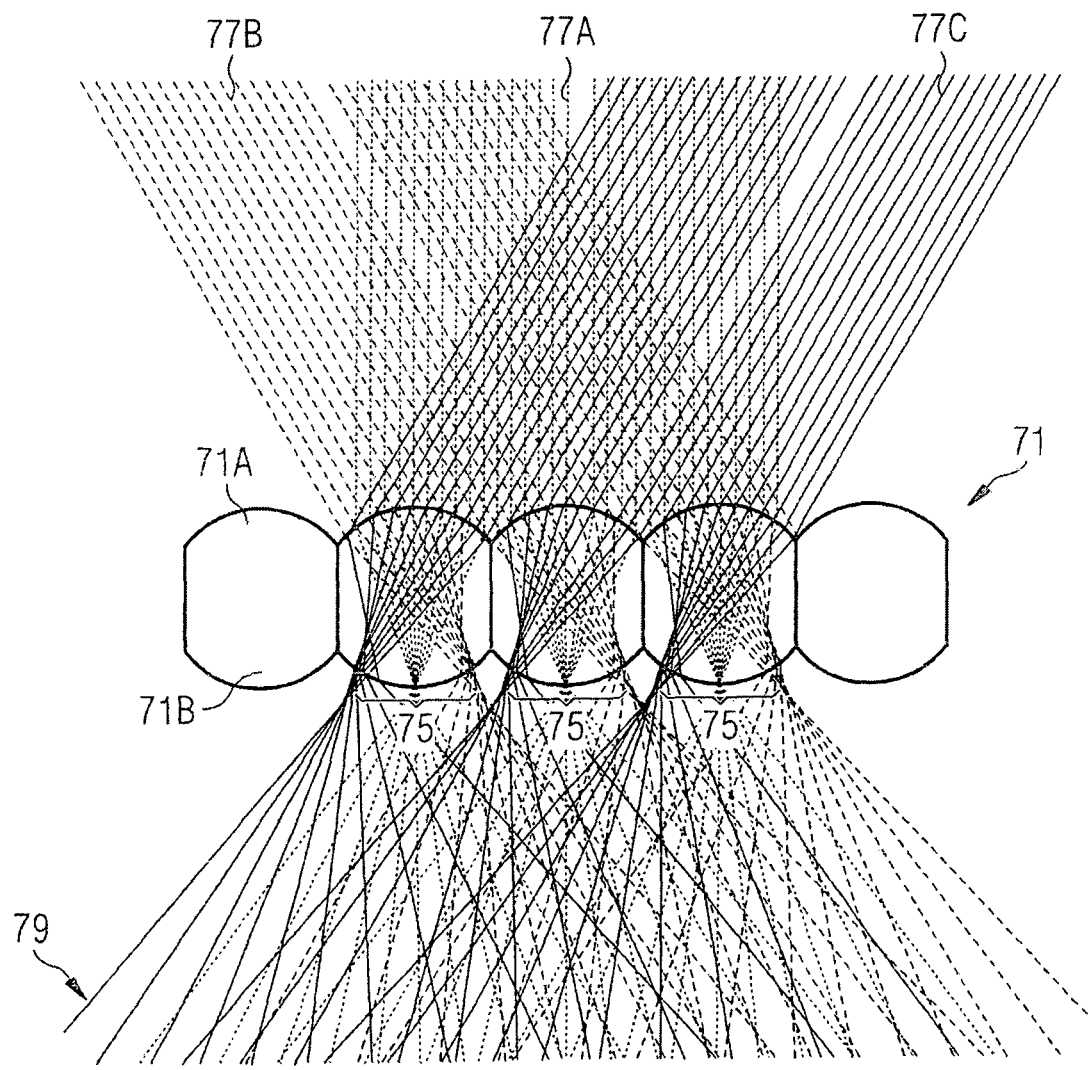

Each section 73 of collimated light 50 falls onto an upstream microlens element 71A. The light is focused onto the exit surface of an associated (in beam propagation direction) downstream microlens element 71B. As illustrated by exaggeration in FIG. 6C, due to the collimation of collimated light 50 to a limited angular range of about 10° or less, only a central area 75 of downstream microlens element 71B is subject to the respective section of collimated light 50. In FIG. 6C, main light rays 77A propagating alone main propagation direction 51 as well as the most divergent light rays 77B, 77C are exemplarily shown. Due to the large number of microlens pairs in tandem configuration that are positioned at a pitch distance p (associated with the lateral size of a microlens element and being smaller than the pitch distance P of the collimator units), a far field intensity distribution 79 generated from those central areas 75 is homogeneous in intensity with respect to the associated optical collimator units 47 as well as the complete light-emitting face 53.

In general, the configuration of homogenizing unit 71 may prevent an observer from resolving the underlying structure of homogenizing unit 71 during operation of the projector system. Moreover, homogenizing unit 71 may be used to further adapt the divergence of direct light beam 15 by moving the downstream lenses out of the focus of the upstream lenses.

Figure 7:
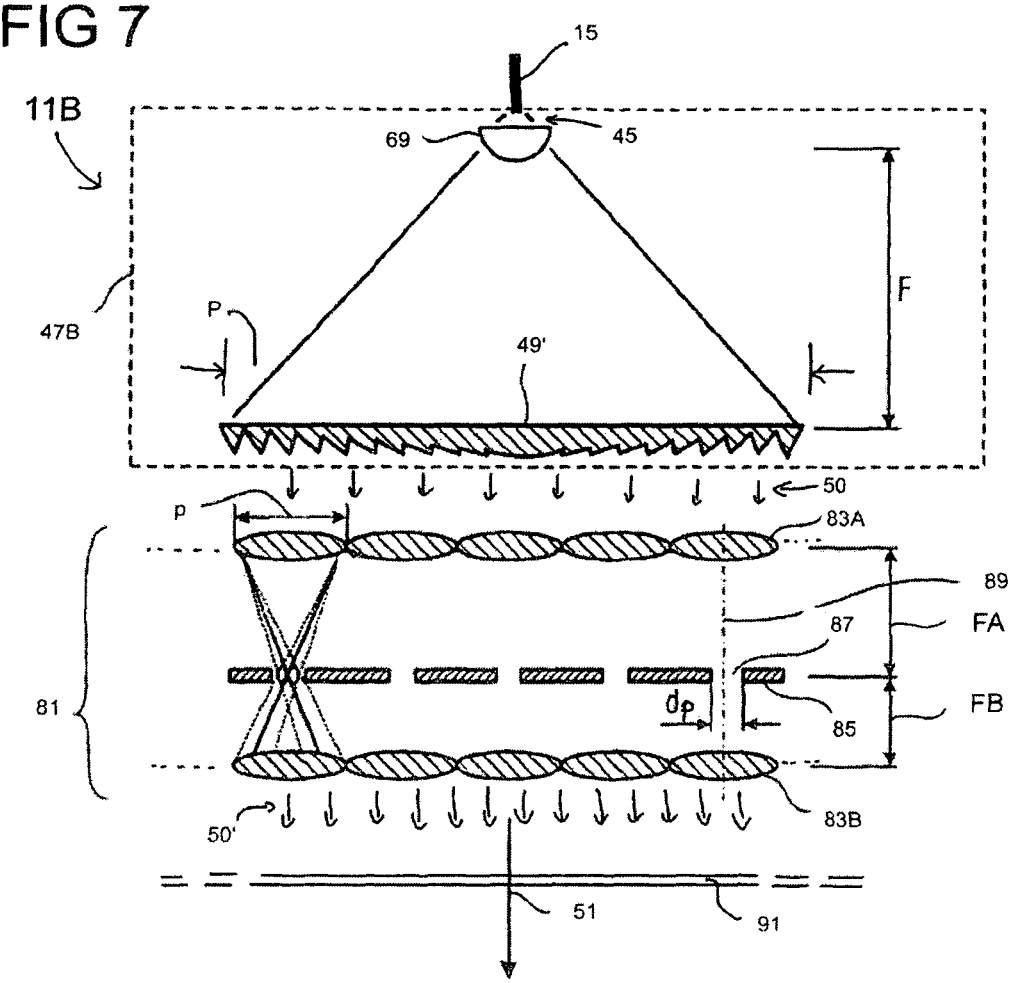
FIG. 7 is a schematic cross-sectional view of an embodiment of an optical collimator unit for sunlight forming unit providing direct light in the near field.

Referring to FIG. 7, a section of a sunlight forming unit 11B is illustrated based on an exemplary optical collimator unit 47B being part of a 2D-arrangement. Optical collimator unit 47B is based on a field lens 69 receiving fiber output light 45 from an associated fiber 15. Field lens 69 partly pre-collimates fiber output light 45 on a Fresnel lens 49' that is positioned downstream at a distance corresponding essentially to a focal length F of Fresnel lens 49'. Optical collimator unit 47B generates collimated light 50 having a, for example, FWHM of the LID in the range of 10° or less.

Collimated light 50 may contain stray light propagating under larger angles and thereby result in an inhomogeneous light distribution. Stray light may, for example, be caused by non-ideal behavior of Fresnel lens 49' such as the presence of scattering from groove tips, multiple internal reflections etc. In consequence, the luminous intensity distribution of collimated light 50 may not reduce smoothly to zero around the desired narrow peak. Instead, it may comprise light components propagating under larger angles as desired.

That situation may create a loss of uniformity such that the Fresnel lens may be viewable as an optical element when looking at the sunlight forming unit. Similar problems with stray light may be present in other configurations of optical collimator units. It is mentioned that stray light effects may in particular be undesired in situations, where a very low luminous intensity background is necessary because a particular intensity peak value may create an inhomogeneity that then is perceived by an observer.

For avoiding, for example, the mentioned stray light contribution to the perception, in the embodiment of FIG. 7, sunlight forming unit 11B further comprises a homogenizing unit 81. Homogenizing unit 81 is based on two arrays of microlenses 83A, 83B that extend in front of the plurality of optical collimator units 47B. Associated pairs of microlenses 83A, 83B are arranged to form an array of telescopes. The array of telescopes is combined with a pinhole structure 85 arranged in a focal plane of the first microlenses 83A. Pinholes 87 of pinhole structure 85 are positioned at (or near) each focus of respective first microlenses 83A. In FIG. 7, for each telescope, the microlenses 83A, 83B and pinhole 87 are lined up along a central axis 89. Microlenses 83A, 83B are positioned again at a pitch p that is associated with the lateral size of the microlenses and is smaller than the pitch distance P of the collimator units (which in FIG. 7 is comparable to the size of Fresnel lens 49').

In such a configuration, pinhole structure 85 eliminates spatial components (propagation angles) that in the focal plane of the first microlens fall outside pinholes 87. Pinhole structure 85 is, accordingly, an absorber system that removes light from the system as a spatial filter. Pinhole structure 85 is, for example, made of light-absorbing material. In consequence, pinhole structure 85 filters out any large angle rays from collimated light 50 such that homogenized collimated light 50' exits homogenizing unit 81.

The image, which is formed in the eye of an observer looking at homogenizing unit 81, is the image of the focal plane of the second lenses 83B inside homogenizer unit 81. Accordingly, a circular image is given for a circular shape of the pinhole assuming it is homogeneously illuminated by optical collimator unit 47B. With respect to the perception of homogenized collimated light 50' as a sun imitation, pinholes 87 may accordingly be configured as circular apertures having a (pinhole) diameter dp as illustrated in FIG. 7. Depending on the transversal size of the homogenization elements, the diameter dp may be smaller than 3 mm such as smaller than 1.5 mm, e.g. 0.5 mm or 0.2 mm. The microlens arrays may be are arranged in a close packing configuration such as a honeycomb configuration. The diameter of the pinholes may be chosen in accordance of the divergence of collimated light 50 impinging onto homogenizing unit 81.

Depending on the alignment of the array of telescopes formed by arrays of microlenses 83A, 83B, the FWHM of the LID may be maintained or slightly increased or decreased. In FIG. 7, a focal length FA of microlenses 83A is exemplarily indicated to be larger than a foal length FB of microlenses 83B. A downstream facing surface of homogenizing unit 81 may further comprise an antireflection coating.

It will be understood that homogenizing unit 81 creates a uniform near field. Thus, optical elements positioned in that near field are homogeneously illuminated by homogenized light beam 50'. As an example, a Rayleigh-like scattering panel 91 is schematically indicated in FIG. 7 and will generate uniform diffuse light as described in more detail below.

Figure 8A:
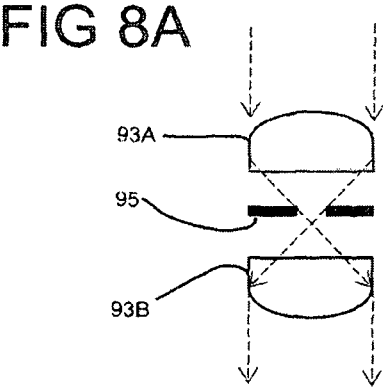
FIGS. 8A and 8B are schematic drawings illustrating the function of a near field homogenizing unit.
Figure 8B:
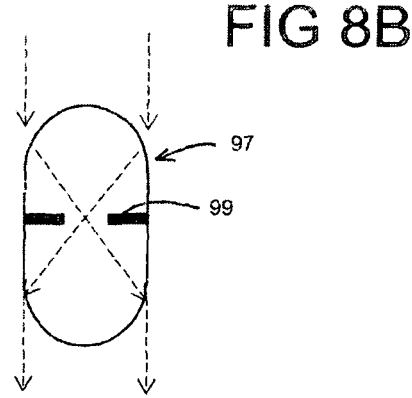

In FIGS. 8A and 8B, exemplarily implementations of telescopes for use in homogenizing unit 81 are illustrated. For example, the embodiment of FIG. 8A is based on two plan-convex microlenses 93A, 93B being spaced apart, facing each other with their plan faces, and having in-between an aperture element 95. In contrast, the embodiment of FIG. 8B comprises a combined microlens element 97 having the respective focusing power provided by the curvature at each side, and an aperture forming modification or structure 99 integrated therein.

In line with the features described in connection with FIGS. 1 to 8B, the sunlight forming units can be configured such that an observer—when looking at a light-emitting face of a sunlight forming unit during operation of the projector system—perceives a bright spot under a narrow visual cone angle that is surrounded by a uniform background. Providing sufficient homogeneity in the bright spot as well across the background will result in the perception of the spot as if it would be located at an infinite distance. This may be due to the generated shift invariance of the perception, both with respect to a binocular-convergence and motion-parallax depth cues, that were also discussed in the above mentioned applications.

As mentioned above, light providing units of solar (hybrid) illumination systems may be configured as hybrid luminaires, in which artificial light sources are coupled to ensure a desired/minimum level of flux emitted from the luminaire. In prior art hybrid illumination systems, artificial light sources are typically placed in close proximity of the emitting surface of the natural light. If a sensor near the collector system (or a sensor in the luminaire) indicates that the measured collected natural light shows a flux level below a threshold value, additional light is provided by the artificial light sources of the prior art hybrid illumination systems.

In embodiments of the projector systems realized by the inventors and disclosed herein, the projector systems may comprise control unit 23 as well as light sensors 25 (see e.g. FIGS. 1 and 3). If the projector system is in particular configured for providing a specific chromatic lighting situation, the light detection of the incoming natural light is analyzed not only in terms of the collected flux, but also in terms of the chromaticity of the collected light. The flux information and the spectral information constitute then the input for a feedback control unit provided within control unit 23. The feedback relates to controlling the additionally provided artificial light not only in intensity but also in the emitted visible spectrum. Accordingly, the below mentioned artificial light sources may be color tunable light sources such as RGBW LEDs. Furthermore, color filters may be used and controlled by control room and go to sleep unit 23 to achieve color tunability.

To maintain the type of illumination and the appearance of a luminaire, the artificial light sources are able to compensate a lack of natural light due to temporarily reduced illumination of the collector system, for example when a cloud covers the sun. Similarly, the artificial light sources are able to compensate the lack of natural light due to the specific time of the day, for example during (early/late) morning, or (early/later) afternoon, evening and night. At those time, obviously less natural light is available for collection. Moreover, color sensitive compensation of the lack of natural light allows maintaining the specific illumination condition despite a change in the chromaticity of the collected natural light from early morning to noon to later afternoon. With respect to the meaning of chromaticity in the present context it is referred to the Standard Terminology of Appearance, ASTM international, E 284-09a, according to which the chromaticity corresponds to the color quality of a color stimulus defined by its chromaticity coordinates (being e.g. the ratio of each of the tristimulus values of any viewed light to the sum of the three).

Various degrees of tunability of sunlight-based projector systems and illumination systems can be provided. For example, light from artificial light sources may complement only direct (collimated) light that may be used in an illumination system for imitating the sunlight, i.e. the light beam downstream the light-emitting face. This configuration is herein also referred to as a hybrid simulated sun configurations. Within an illumination system, light from artificial light sources may be used to generate diffused light, e.g. for imitating the sky. This is herein also referred to as hybrid simulated sky configurations. For example, a side-lit light guide panel may generate diffuse blue light emitted from the panel, while at the same time the bright (sun-like) direct light beam shines and further illuminates the room. Moreover, light from artificial light sources may contribute to the light beam and the diffuse light, e.g. by Rayleigh scattering or by separate types and configurations of artificial light sources.

Referring to the herein disclosed aspects on hybrid lighting systems for sun-sky imitation, artificial light sources may complement natural light for directional illumination and simulating the sun. Thereby, the artificial light sources may ensure standard sun-sky imitation and functionalities during the period of lack or reduced of natural light. Direct light related artificial light sources can be further controlled to tune the color of the simulated sun as in the natural dynamic through the day.

In some operation modes of hybrid sun-sky imitating illumination systems, it may be further desired to keep a sunset operation mode despite the light of the noon sun is shining onto the collector system for collection. Then, it may be required to attenuate the collected light. Light attenuation may be achieved by chromatic filters placed near the collection systems, such as upstream or downstream the fibers, thereby enforcing the desired color of the collected light. In addition, fine-tuning of the colors may be performed with artificial light sources. Moreover, color tuning may be performed by a controlled misalignment of the collector system. Usually, in its standard working condition, the collector system would be aligned to maximize the energy in-coupling by processing the flux signal and/or the geo-positioning of the collector system with respect to the sun. Thus, misalignment will reduce the flux signal. Further control mechanisms may be based on shutters and/or apertures placed at one or both sides of the fibers.

Obviously, hybrid simulated sun configurations may be combined with hybrid simulated sky configurations. For example, a scattering panel with nano-sized scatterers (e.g. nanoparticles, nano-voids, or nano-droplets) may be used for the generation of the diffused light component. The artificial light sources may be used to enhance the correlated color temperature (CCT) of the direct light that impinges on the scattering panel, where it is then partly Rayleigh-like scattered—like the sunlight by the atmosphere. In another embodiments, an edge-lit light guide panel may receive light from artificial light sources or may be operated in combination with a scattering panel.

For completeness it is noted that, when using an edge-lit light guide panel, natural light may similarly be collected at the outside and guided by fibers to the edge-lit light guide panel. There it may complement, for example, light from artificial light sources. In some embodiments or operation modes, natural light may be dedicated only to the diffuse sky imitation, optionally in combination with chromatic tuning and/or attenuation.

To summarize the various hybrid configurations that are possible by combining natural light based illumination with artificial light based illumination, the direct light beam may be based on natural light, when the projector system is "powered" by the real sun, or it may be based on natural light and artificial light, in hybrid operating conditions. Additionally, direct light may be just artificial light during the night, if illumination is needed.

In hybrid sun-sky imitating illumination system, the diffuse light resembling the sky may be based on the direct light beam (by scattering natural light and/or artificial light), or it may be based on natural light and artificial light provided to a light guide panel, e.g. in a side-lit embodiment. Moreover, color tuning of the artificial light source may ensure a desired chromatic separation of the direct and diffuse light.

In connection with FIGS. 9A to 11, various embodiments for coupling artificially generated light into the beam path of collected natural light are described that form the basis for hybrid projector systems.

Figure 9A:
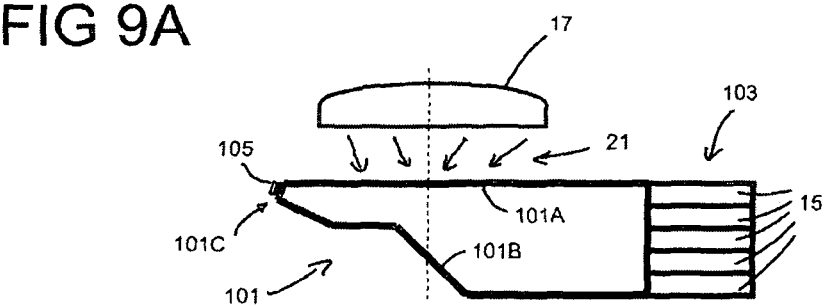
FIGS. 9A and 9B are schematic drawings illustrating the coupling of artificially generated light into the beam path of collected natural light at an input side of optical fibers.
Figure 9B:
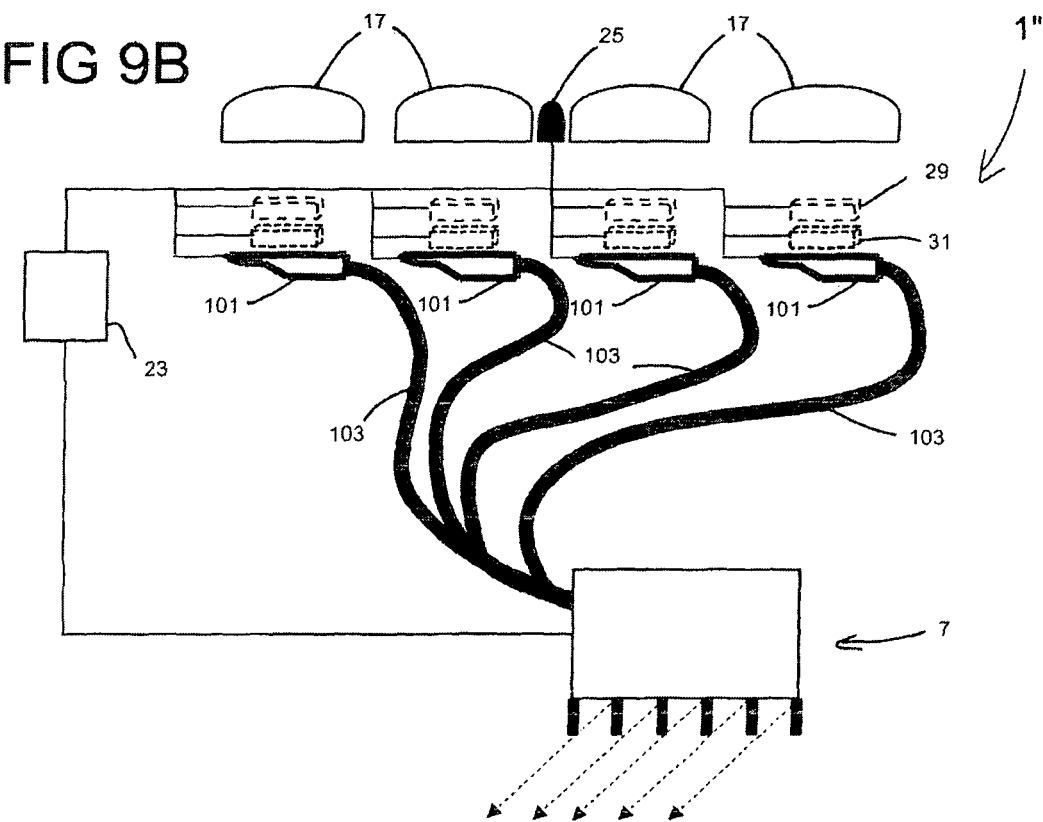

For example, FIGS. 9A and 9B illustrate the coupling of light, which is artificially generated with sunlight balancing light sources, and/or collected natural light into an optical fiber bundle. Specifically, a stepped waveguide 101 is used to couple collected light 21 focused by, for example, lens 17 into a bundle 103 of fibers 15, for example by mirror-like reflection. For that purpose, stepped waveguide 101 comprises a (natural light receiving) face 101A through which the natural light enters stepped waveguide 101, and redirecting faces 101B that reflect the natural light onto fiber input ends of fibers 15. Opposing to the fiber input ends, stepped waveguide 101 provides input faces 101C through which artificially generated light from one or more sunlight balancing light sources 105 can be coupled into stepped waveguide 101. An LED is indicated in FIG. 9A as an example of a sunlight balancing light source 105. Accordingly, artificially generated light as well as natural light are guided by fibers 15 to the respective optical collimator units and the beam paths of the natural light and the artificial light are combined at an input side of optical fibers 15.

In the illumination system 1″ shown in FIG. 9B, a plurality of stepped waveguide-based coupling configurations are used to provide natural light and artificially generated light to luminaire 7. FIG. 9B corresponds essentially to FIG. 1 and shows a plurality of lenses 17, a plurality of filter elements 29 and shutter elements 31, a plurality of stepped waveguides 101 each receiving light from a respective lens 17 as well as respective LED(s) (not shown), and a plurality of fiber bundles 103 receiving light from respective stepped waveguides 101 and guiding the same to luminaire 7. As in FIG. 1, control unit 23 receives information from light sensor 25 and controls the operation of the artificial light sources optionally in combination with controlling the operation/presence of filter elements and/or shutter elements, and/or controlling components of the sunlight forming unit within luminaire 7.

Figure 10A:
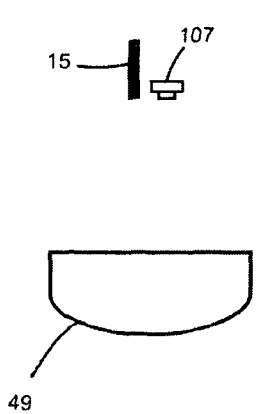
FIGS. 10A to 10G are schematic drawings illustrating the coupling of artificially generated light into the beam path of collected natural light at an output side of optical fibers.
Figure 10B:
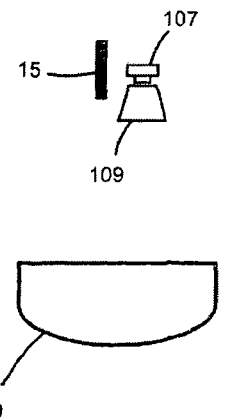
Figure 10C:
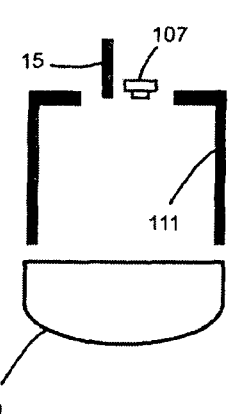
Figure 10D:
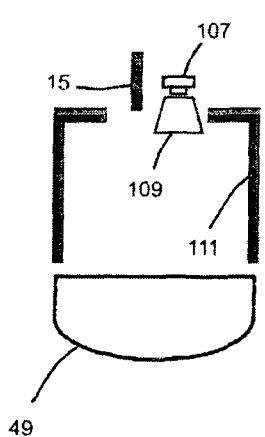
Figure 10E:
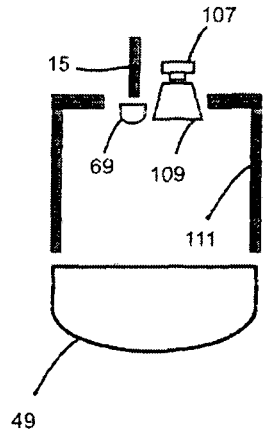
Figure 10F:
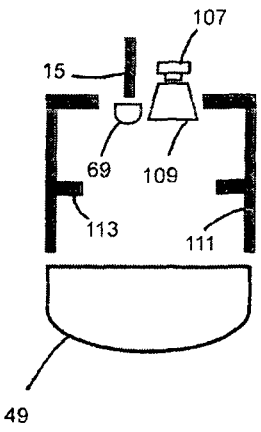
Figure 10G:
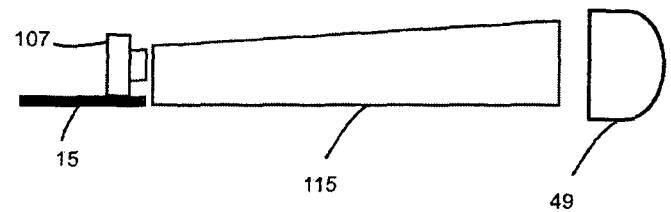
Figure 11:
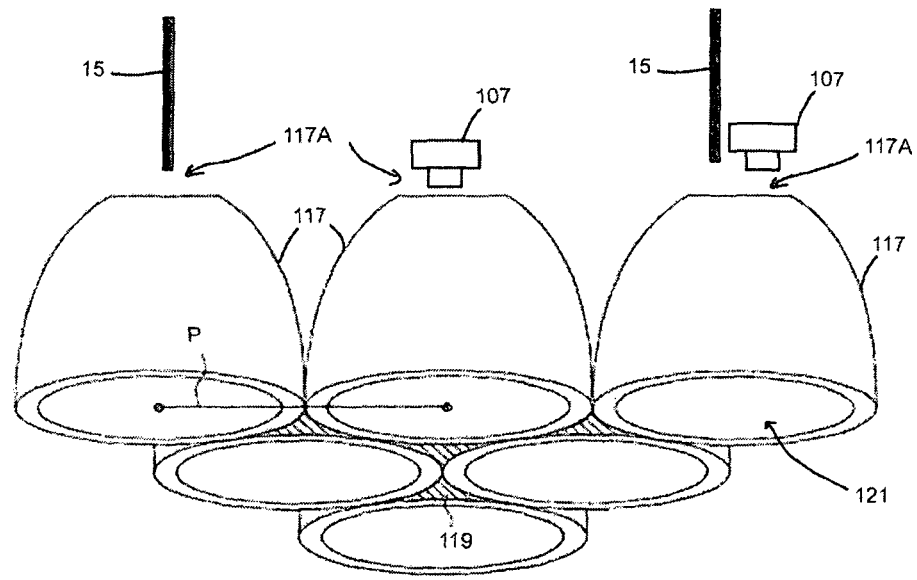
FIG. 11 is a schematic illustration of an exemplary reflection-based sunlight forming unit of a projector system.

FIGS. 10A and 10G illustrate schematically and exemplarily how optical collimator units can be provided with artificially generated light and natural light.

In the simple configuration of FIG. 10A, an LED 107 is positioned next to the fiber output end of fiber 15. In such a simple configuration, the perception of the light-emitting face of the sunlight forming unit may show some non-uniformity such that the configuration may in particular be of interest for illumination systems using an appearance affecting optical system (see FIGS. 1 and 9B).

The configuration of FIG. 10B is improved by a pre-collimation optic such as a compound parabolic concentrator (CPC) 109 or a TIR lens mounted on LED 107. The pre-collimation optic allows tailoring the artificial illumination with respect to the collimator (here lens 49), because the collimator may be optimized with respect to the fiber output light. Assuming properly adapted beam parameters, cross-talk with respect to neighboring optical collimator units may be sufficiently suppressed such that the configuration of FIG. 10 B may also be applied in illumination systems in which the light-emitting face is observable from within an illuminated room.

As shown in FIG. 10C, an alternative approach to limit any potential cross-talk of an LED output to neighboring optical collimator units (neighboring collimator/lens), an absorber structural element 111 may be provided to delimit optical collimator unit 47 upstream of the collimator (e.g. lens 49). Thereby, unwanted LED light is taken out of the system.

FIG. 10D illustrates a combination of the embodiments of FIG. 10B and FIG. 10C such that the LED light is sufficiently coupled into lens 49 and potential stray light is nevertheless reduced by absorber structural element 111.

Referring to FIG. 10E, to further improve the adaptation of the beam parameters of the fiber output light, field lens 69 may be used as discussed in connection with FIG. 5. Accordingly, field lens 69 and CPC 109 may be adapted and optimized with respect to the focal length and size of lens 49.

As shown in FIG. 10F, additional beam blocking structures 113 may be provided at absorber structural element 111. Thereby, light traveling into and out of optical collimator unit 47 may be removed from the system. The beam blocking structures 113 include exemplarily absorbing knife structures that reduce unwanted reflections.

FIG. 10G illustrates another implementation for coupling artificially generated light into the beam path of collected natural light at an output side of optical fiber 15. Specifically, fiber 15 and LED 107 are configured and positioned to couple light into a mixing light guide 115 guiding the light towards lens 49.

As will be understood in particular in view of FIGS. 10A to 10G, when coupling light (artificial and natural) into an optical collimator unit, the sunlight balancing light source is positioned close to the fiber output end providing the natural light. For example, a light output region of an LED is positioned next to a fiber output end. Moreover, divergences of the artificially generated light and the natural light are adapted with respect to each other to ensure an efficient and similar collimation process for both types of light within the optical collimator units.

In general, sunlight balancing light sources are controlled to stabilize the total amount of light provided by the projector system and/or to stabilize the color appearance of the direct light beam and or the diffuse light component and/or the direct light component of a hybrid illumination system. Exemplary sunlight balancing light sources include a dynamic light emitter such as an LED source that is controllable in the emitted light spectrum (CCT and color) and that is dimmable (luminous power reduction). The LED source may be based on one or a combination of blue LEDs, white LEDs, amber LEDs, cyan LEDs, green LEDs . . . . The sunlight balancing light sources contribute to the total light emerging from the light-emitting surface, and can be controlled to dynamically contribute to the total light emerging from the light-emitting surface, and to compensate the color and intensity variations of the light beam provided by the collector system.

Referring to FIG. 11, a sunlight forming unit may comprises a plurality of optical collimator units in an arrangement in 2D that can be based on reflective collectors such as CPCs 117. At respective input openings 117A of CPCs 117, FIG. 11 illustrates a plurality of constellations. For example, in a pure sunlight operated illumination system/projector system, only light from fiber 15 may be coupled into CPC 117. For hybrid embodiments of illumination systems/projector systems, fiber 15 and one or more LEDs 107 may couple light into CPC 117. In some embodiments, in particular for embodiments of small-scale optical collimator units or illumination systems for which the light-emitting face cannot be seen by an observer, some CPCs may receive light from fibers only, while some CPCs receive light from LEDs only.

For completeness, it is noted that the 2D arrangement of FIG. 11 corresponds to a close packing arrangement that allows the formation of a well collimated direct light beam 15. As can be seen in FIG. 11, larger non-emitting transition areas 119 are located in between CPCs 117. Neighboring CPCs 117 are arranged at a pitch distance P, which is indicted in FIG. 11 with respect to the center positions of output areas 121 of CPC 117.

FIGS. 12A to 12C illustrated schematically luminaires 7 of illumination systems that combine a projector system as disclosed before with an aereal diffuser panel. The embodiments of FIGS. 12A to 12C are shown without a separate housing for the sunlight forming unit for simplicity (but could be added if needed) and without an appearance affecting optical system. The appearance affecting optical systems may be provided in case of a reduced uniformity of direct light beam 15 such that luminous structural features of continuous light-emitting face of the sunlight forming unit does not affect the appearance, in particular the infinity associated with a sun-sky imitation.

Referring to FIG. 12A, the sunlight forming unit comprises a simple configuration of optical collimator units (each only comprising a single lens 49), a homogenizing unit 71, and a mirror element 35. Mirror element 35 is used for redirecting light beam 15 having passed homogenizing unit 71. In some embodiments, mirror element 35 may further reduce the divergence of the direct light beam in, for example, one direction as shown in FIG. 12A. The plurality of optical collimator units, homogenizing unit 71, and mirror element 35 are installed within a lightproof housing 123 having only small openings for receiving optical fibers 15. Optical fibers 15 are distributed over a regular grid to cover a large area. Housing 123 comprises an opening 125 through which light beam 15 is reflected by mirror element 35 to illuminate a room.

Opening 125 is closed by a light transparent nanoparticle based Rayleigh diffuser panel 127.

Due to the specific concentration of nanoparticles, their size, and their index of refraction with respect to the index of refraction of a surrounding matrix, short wavelengths components of direct light beam 15 are more efficiently scattered than longer wavelength components. Accordingly, a portion of direct lighting 15 will be emitted from diffuser panel 127 as a diffuse light component 37. Due to the Rayleigh-like scattering, the CCT of direct light component 33 (the remaining part of direct light beam 15) will be decreased with respect to the CCT of diffuse light component 37.

Referring to FIG. 12B, the sunlight forming unit is based on optical collimator units as illustrated in FIG. 10C. Accordingly, the illumination system of FIG. 12B comprises sunlight balancing LEDs 107 that can contribute artificially generated light to direct light beam 15. As schematically indicated in FIG. 12B, light sensor 25 is arranged to measure intensity and chromaticity information with respect to direct light beam 15 within housing 123. Light sensor 25 is connected to a control unit that analyzes the intensity and chromaticity information and provides control signals to sunlight balancing LEDs 107.

Referring to FIG. 12C, luminaire 7 comprises a side-lit light guide panel 129 instead of Rayleigh diffuser panel 127 of FIGS. 12A and 12B. Side-lit light guide panel 129 receives artificially generated light from LEDs 131 (herein also referred to as supporting light source). The light scatters out of side lit light guide panel 129 based on specifically provided diffuse scattering structural elements (not shown), thereby generating diffuse light component 37 independently from light beam 15. Accordingly, direct light beam 15 is chromatically not affected when passing side-lit light guide panel 129 and thus essentially forms direct light component 33. The embodiment of FIG. 12C comprises similarly light sensor 25 within housing 123 that may receive information on the intensity and chromaticity of direct light beam 15, which in this case is based on natural light only. The control unit will analyze that information and control the amount of light input into side-lit light guide panel 129 such that the overall illumination provided to the room may be maintained essentially constant despite any variations of the amount of collected natural outdoor light.

The embodiments of FIGS. 12A to 12C are primarily used for generating a homogeneous intermediate or far field, that is then used for the generation of the diffused light component by uniform Rayleigh scattering conditions across the diffuser panel. In contrast, the embodiments of FIGS. 13A to 13C may be used for generating a homogeneous near field, such that uniform Rayleigh scattering conditions are already achieved close to, in the case of FIGS. 13A to 13C, a spatial filtering homogenizing unit 81. Thereby, compact configurations of sunlight forming units can be set up that use natural light as well as optionally artificially generated light.

Figure 13A:
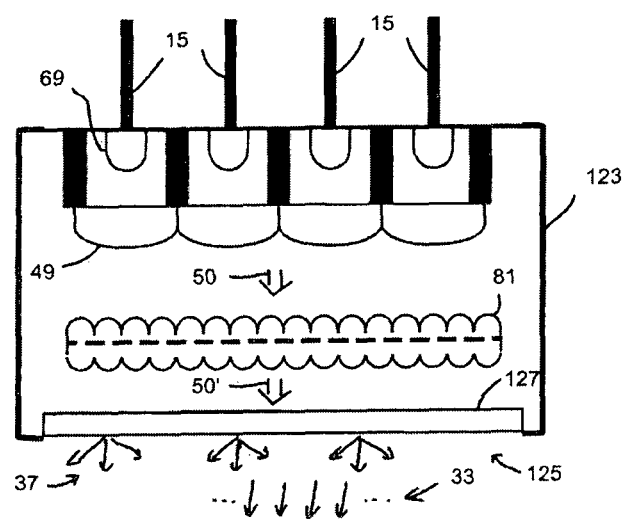
FIGS. 13A to 13C are schematic drawings illustrating various configurations of illumination systems with additional diffuse light generation in the near field.
Figure 13B:
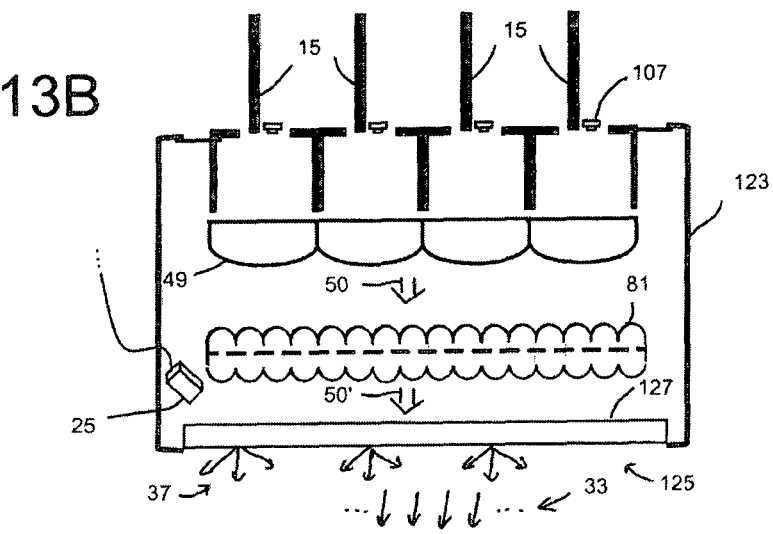
Figure 13C:
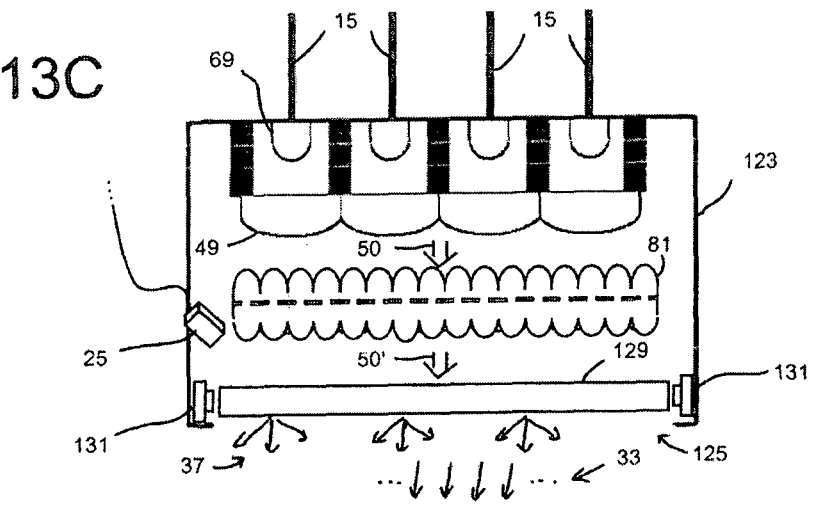

FIGS. 13A to 13C illustrated schematically luminaires 7 of illumination systems that combine a compact projector system as disclosed before with an aereal diffuser panel. As such systems may allow the perception of a circular bright spot observed under the main peak direction of the continuously extending large light-emitting face, appearance affecting optical systems are usually not needed and an observer may be allowed to view into luminaire 7. However, appearance affecting optical systems may be provided, if the desired uniformity is not given or for aesthetic reasons.

Referring to FIG. 13A, the sunlight forming unit comprises a plurality of optical collimator units that are configured to minimize crosstalk, e.g. by configurations as disclosed in FIGS. 10C to 10F. Accordingly, light beam 50 comprises a high contrast with respect to its angular LID even downstream of lenses 49. Light beam 15 is additionally homogenized with homogenizing unit 81. A mirror element as illustrated in FIGS. 12A to 12C may accordingly not be needed within housing 123. The plurality of optical collimator units and homogenizing unit 81 are installed within lightproof housing 123 together with a diffused light generating panel 127. Housing 123 has only small openings for receiving optical fibers 15 that are distributed over a regular grid at the back side. The grid covers the required large area that essentially determines the size of the continuously extending large light-emitting face, which illuminates the room, and is viewable by an observer.

As in FIG. 12A, opening 125 of housing 123 is closed by light transparent nanoparticle based Rayleigh diffuser panel 127. Due to the specific concentration of nanoparticles, their size, and their index of refraction with respect to the index of refraction of a surrounding matrix, short wavelengths components of direct light beam 15 are more efficiently scattered than longer wavelength components. Accordingly, a portion of direct light beam 15 will be emitted from diffuser panel 127 as a diffuse light component 37. Due to the Rayleigh scattering, the CCT of direct light component 33 (the remaining part of direct light beam 15) will be decreased with respect to the CCT of diffuse light component 37.

In contrast to FIG. 13A, the sunlight forming unit of FIG. 13B is based on optical collimator units that comprise sunlight balancing LEDs 107 such that artificially generated light can be added to direct light beam 15. As schematically indicated in FIG. 13B, light sensor 25 within housing 123 is arranged to measure intensity and chromaticity information with respect to back-scattered light of diffuse light component 37. Light sensor 25 is connected to a control unit that analyses the intensity and chromaticity information and provides control signals to sunlight balancing LEDs 107.

Referring to FIG. 13C, luminaire 7 comprises a side-lit light guide panel 129 instead of Rayleigh diffuser panel 127 of FIG. 13A. Side-lit light guide panel 129 allows the generation of a diffuse light component independently of the direct light beam as described in connection with FIG. 12C. As in FIG. 13B, the housing comprises light sensor 25 within housing 123 that measures intensity and chromaticity information of diffuse light component 37. The control unit will analyze that information—optionally together with information on the direct light—and control the amount of light input into side-lit light guide panel 129 such that the overall illumination provided to the room may be maintained essentially constant despite any variations of the amount of collected natural outdoor light 21.

The skilled person will understand that additional combinations of embodiments such as the ones described in connection with FIGS. 12A to 13C as well as FIGS. 9A and 9B may be possible and may further increase the flexibility of the illumination systems with respect to tunability. For example, sunlight balancing LEDs 107, sunlight balancing LEDs 105, and/or supporting light sources 131 may be combined with each other.

In the following, schemes of illumination situations are summarized that can be achieved with artificial light sources of a hybrid illumination system. The hybrid system may further use one or more "sun chromatic filters" for color adjustments (positioned upstream/downstream respective fibers) and one or more "sun shutters" (or actively induce misalignment procedures of the collector system) for reducing the delivered flux.

In general, the presence of a blue sky will impose a higher CCT level for any directional light used to create the diffused sky light by scattering, in contrast to an edge-lit light guide panel that is separately supplied by blue light. In case the edge lit system is powered also by fibers carrying natural light, the chromatic filter and shutter upstream this group of fibers may be independent with respect the other group related to the directional light. It will be understood that the sky-like illumination can be set up independently or may be linked to the direct light beam and is ignored in the following control aspects of a sunlight-based projector system for simplicity.

Assuming, that the desired illumination within the room should correspond to outside lighting conditions at noon. During the course of the day, the external lighting conditions will change from morning, noon, afternoon to night. In addition, a cloudy situation may occur that in its chromatic aspects may be similar to the night, e.g. assuming that a grey like illumination can be perceived. The following control assumes that the direct light beam is used to generate the diffuse light by Rayleigh scattering.

It will be understood that at noon (assuming a bright sky) essentially only sun-like light is collected and guided with the fibers to the light-emitting face. Accordingly, the sun shutter element, chromatic filter element, or any additional supplemental light source do not need to be actuated to provide a sun-like direct light beam having the chromaticity of the sunlight.

In contrast, during morning or afternoon, due to the increased Rayleigh scattering in the sky, the collected natural light is decreased in CCT. To counteract, chromatic filters can be used that remove lower CCT components of the collected natural light and/or supplementing light sources can be used that add higher CCT components to the collected natural light.

Obviously at night or at a cloudy day, the projector system can exclusively be operated using the supplementing light sources and particularly providing the desired chromatic spectrum.

When the desired illumination within the room relates to the morning or afternoon, and the outside lighting conditions correspond to noon, chromatic filters can be used that remove higher CCT components of the collected light and/or supplementing light sources can be used to add lower CCT components to the collected natural light.

For such a desired morning/afternoon illumination, clearly, during morning or afternoon, no action needs to be taken, although supplementing light sources may be used to fine-tune the provided CCT of the direct light beam and/or to increase the amount of illumination provided to the room.

Again, at night or at a cloudy day, the projector system can exclusively be operated using the supplementing light sources.

When during the day the desired illumination within the room should represent, for example, the moonlight at night (with low brightness), sun shutters can be used at noon to reduce the brightness. In the morning or afternoon, while the sun shutters may not be used, lower CCT components may be reduced by the sun chromatic filter. At night, supplementing light sources tuned in color to the moon may be used while the sun shutter as well as the sun chromatic filter may not be needed.

It will be understood that the availability of supplementing light sources for generating diffuse light provides additional options to affect the color perception of an illumination system using a sunlight-based projector system. For example, assuming that a side-lit light guide is additionally provided to a Rayleigh scattering panel, if the collective natural light—e.g. due to a cloud moving in—is reduced in high CCT components, the LED light may be provided at that missing CCT components to the side-lit light guide, thereby, maintaining the chromatic appearance. Additionally, if the collected sunlight is less bright, the overall all illumination of the room may be compensated by adding a white light component to the side-lit light guide.

In view of the above, it will be understood that various embodiments may be used to achieve specific luminous intensity distributions that result in the desired sun-sky imitating illumination. For that, the luminous intensity distribution includes two components, one for the diffused light 37 and one for the directed light 33.

Figure 14A:
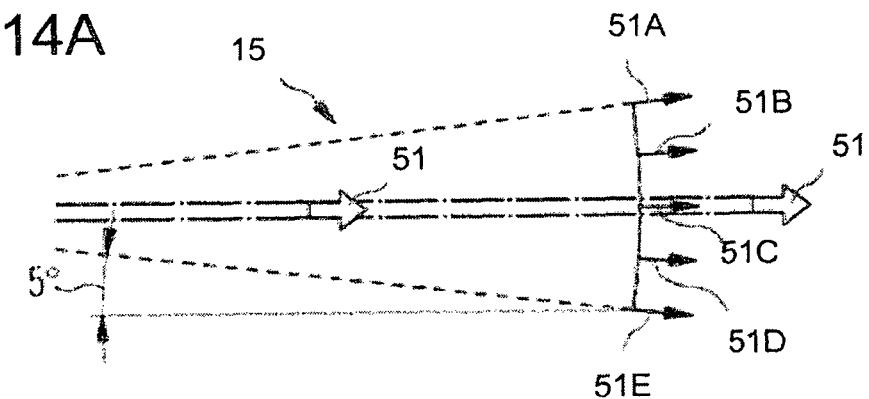
FIGS. 14A to 14C are schematic drawings illustrating aspects of the luminous intensity profiles associated with direct and diffuse light components.
Figure 14B:
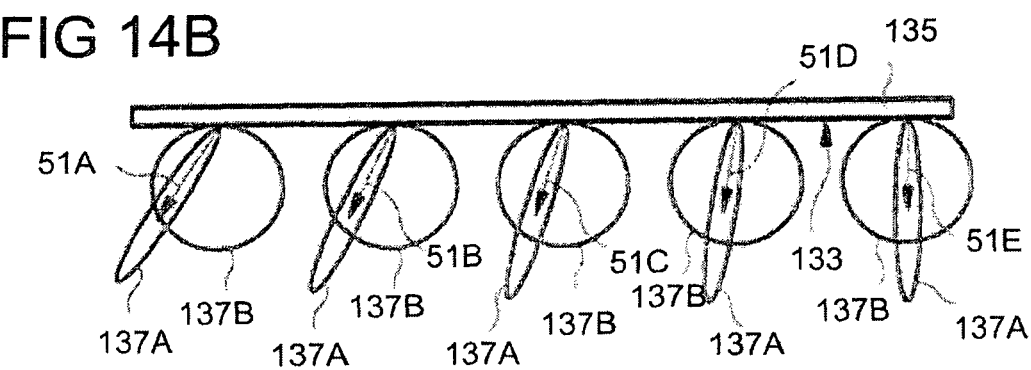
Figure 14C:
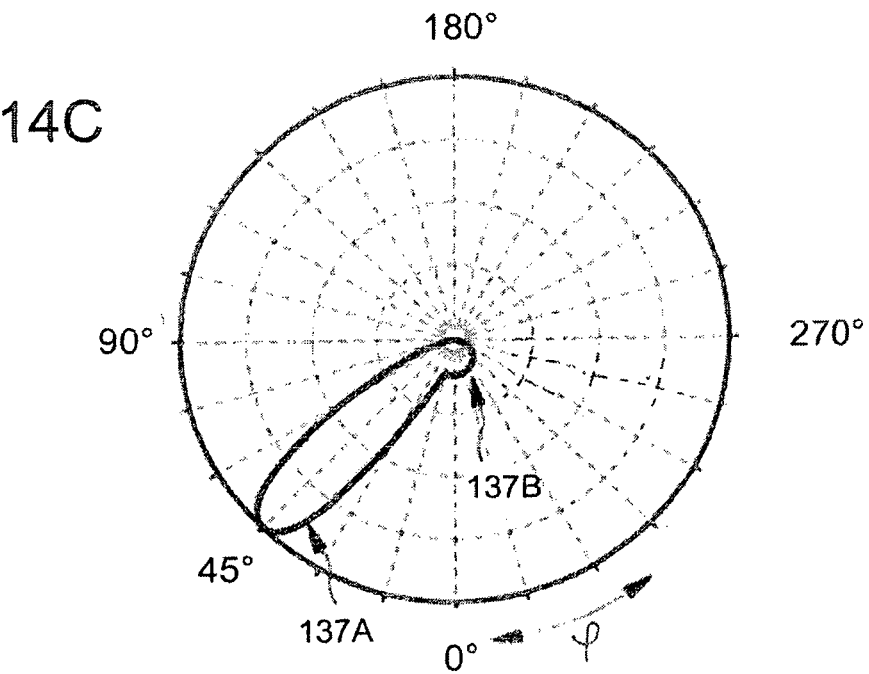

FIGS. 14A to 14C illustrate direct light beam 15 and schematic LIDs associated with direct light component 33 and diffuse light component 37.

Referring first to FIG. 14A, direct light beam 15 may comprise light rays that propagate essentially along local main directions 51A-51E (indicated as arrows in FIG. 14A). Local main directions 51A-51E are associated with positions across light beam 15. The deviation of local main directions 51A-51E from main propagation direction 51 increases with the distance from the center of direct light beam 15.

Referring to FIG. 14B, looking at a light exiting surface 133 of a planar Rayleigh-diffuser panel 135 and assuming that direct light beam 15 interacts with Rayleigh-diffuser panel 135, at each location of light exiting surface 133, the local luminous intensity peak of an associated direct light component 33A for a specific location will be aligned along a respective local main direction 51A-51E.

As will be understood by the skilled person, upstream of the far field (i.e. in an intermediate field between the near field and the far field), at each location across direct light beam 15, light will still comprise a plurality of propagation directions, e.g. within a local solid angular range corresponding to e.g. 5°. Accordingly, illuminating Rayleigh-diffuser panel 135 results in an essentially constant local main direction across the planar Rayleigh-diffuser panel as illustrate in FIG. 14B by arrows 51A-51E indicating the direction of locally associated direct light component 137A. A respective direct light component 137A may be associated with a specific location of dichroic light exiting surface 133 and the local direct light rays may cover essentially the emission solid angle of direct light beam 15.

With respect to generating the diffuse light by Rayleigh-like scattering, the diffuse light generated with Rayleigh-diffuser panel 135 has essentially the same Lambertian-like luminous intensity distribution at each location across light exiting surface 133 as illustrate in FIG. 14B locally by a shift invariant diffuse light component 137B.

As for sun-sky imitated illumination, direct light component 33 has a CCT smaller than the CCT of diffuse light component 37, the Rayleigh-diffuser panel can be considered a dichroic light exiting surface 133.

The LID's components 137A, 137B depend on two angular coordinates $\vartheta$, $\varphi$. In the illustrated polar plots, the angular coordinate $\varphi$ is in the plane of the drawing with 0° pointing vertically down to earth. The luminous intensity is illustrated in an arbitrary scale.

FIG. 14C shows, in more detail, a polar plot of the LID with components 137A, 137B that are respectively associated with direct light component 33 and diffuse light component 37 for the angular coordinate $\varphi$. The maximum of the direct light component 137A is at 45°. That means direct light beam 15 impinged under an angle of 45° onto Rayleigh diffuser panel 127 as well as onto the lamellae of appearance affecting optical system 39. The luminous intensity peak of the LID corresponding to the direct light component 137A may have in FIG. 14C a full width half maximum that is about 30° or smaller. (In other embodiments it may be, for example, 15° or less such as 10° or less or even 5° or less.) Such a broader FWHM of the distribution reported in FIG. 14C may be present, for example, in embodiments as illustrated in FIG. 1 where direct light beam 15 passes through a lamella structure composed of a set of parallel lamellae that broaden the original LID's FWHM corresponding to the direct light beam 15, e.g. by forward scattering.

The Rayleigh scattering resulted in the generation of diffused light component 37 associated with Lambertian-like LID 137B that is indicated in FIG. 14C by a small circular-looking curve section at low intensity, i.e. at intensities much lower than the direct light contribution.

It will be understood that the distribution given in the plane of drawings may be similarly given in all directions (symmetric beam) or that there may be some differences in different cross-section directions through the beam. Differences may be corrected, for example, with a mirror unit as shown in FIG. 1.

To provide for a space invariant perception of the direct light component across a sun-like dimensioned beam cross-section, a light emitting surface needs to have at least a minimum size. That minimum size depends on the desired size of the to be perceived/imitated sun, which again relates to the distance from light exiting surface 133 to the observer. In common indoor configuration (observation distances from 1 m to 5 m), light exiting surface sizes are essentially at least 10 cm in each direction such as at least 15 cm, 20 cm, or 30 cm. It is noted that the size mentioned before should in addition ensure that not only the sun is perceived but that also from some surrounding area a sky-like contribution can be appreciated. That means a larger divergence sun requires a larger unit to ensure that not from all areas of the light emitting surface only direct light is perceived and instead, from some surrounding area diffused light is perceived. Moreover, light exiting surface 133 may be identical (at least in size) with the continuously extending large light-emitting face of the sunlight forming unit in embodiments such as indicated in FIGS. 13A to 13C, while due to the beam divergence and the required distance between e.g. Rayleigh-scatterer panel and the sunlight forming unit, the continuously extending large light-emitting face of the sunlight forming unit of FIGS. 13A to 13C may be smaller than light exiting surface 133.

Returning to diffuse light LID 137B of FIG. 14B, the essentially Lambertian-like distribution will ensure that the skylight component is seen under essentially all angles (as long as not "hidden" by the much brighter sun-like direct light). As broad distribution ensures that the window-like perception will be provided essentially when looking at the light emitting surface from any direction. In any case, the diffuse light generation may preferably have an emission that is essentially uniform across the panel as indicated in FIG. 14B.

If a homogeneous sky appearance is intended, diffuse light component 37 and thus the local diffuse light component 137B of the LID is supposed to be essentially shift invariant across the light exiting surface 133. As noted, providing a uniform perception of the direct light component as well as of the diffuse light component may result in an infinite depth perception.

In some embodiments, the uniformity of the direct light component of the LID may be defined by requiring that a direct light component profile $LID_{direct}(\vartheta, \varphi)$ is—with respect to isolated/local spatial coordinates (x, y) of the panel—uniform across the first emitting surface such that the ratio between a standard deviation of the local $LID_{direct}$ spatial fluctuations and a $LID_{direct}$ average value does not exceed the value of 0.3 within any 10 mm diameter spatial circular areas and for at least 90% of the light exiting surface 135, for any fixed azimuthal angle and for any fixed polar angle greater than 3 time the half width half maximum of the peak.

The direct light component of the LID, $LID_{direct}(\vartheta, \varphi)$ has further a narrow peak in the distribution around the main propagation direction 51, such that the $LID_{direct}$ profile drops below 1% of a maximum value of the $LID_{direct}$ profile for polar angles larger than 3 times the angle of the half width half maximum (HWHM), where the HWHM is computed on the $LID_{direct}$ profile generated from all the light exiting surface. The angle of the HWHM may be smaller than 5°. The $LID_{direct}$ profile for polar angles smaller than the angle of the HWHM is virtually independent on the azimuthal angle, wherein the polar angles and the azimuthal angles are measured in an angular coordinate system assigning 0° to the main propagation direction corresponding to the maximum value of the $LID_{direct}$ profile generated from all the light exiting surface.

In some embodiments, the supplementary light sources may comprise a white tunable emitter. The white tunable emitter may be tuned in intensity and/or spectral emission properties, e.g. light output CCT. In the case of tunable CCT, the light emitted by the secondary light source can be tuned in the range 2000K to 10000K, such as 3000K to 7000K.

Generally, the light source can be, for example, a cool white light source. Exemplary embodiments of light sources may comprise LED based light emitters or discharge lamp based light emitters or hydrargyrum medium-arc iodide lamp based light emitters or halogen lamp based light emitters and respective optical systems downstream of the respective light emitter.

Referring generally to the dichroic features of the light provided by the herein disclosed lighting systems, for example, the diffuse light component may comprise a portion of the total incident energy in the range from 5% to 70%, such within the range from 7% to 50%, or even in the range from 10% to 30%, or within the range from 15% to 20%. The average CCT of the diffuse light component may be significantly higher than the average correlated color temperature CCT of the directional light component. For example, it may be higher by a factor of 1.2, or 1.3, or 1.5 or more. In general, the diffuser unit may not absorb significantly incident light.

Referring to passive Rayleigh diffuser, depending on the specific interaction of the Rayleigh diffuser with the incident light, the color and/or CCT of the direct and diffuse light may be affected in various manners.

For example, the direct and diffuse light components may be separated in the CIE 1976 (u',v') color space by, at least 0.008 such as at least 0.01, 0.025, or 0.04, where the color difference Δu'v' is defined as the Euclidean distance in the u'v' color space. In particular for sunlight based configurations, the direct light beam CCT may be close to the Planckian locus (e.g. in the range from 800 K to 6 500 K). In some embodiments the second color may correspond to u'v' points with a maximum distance from the Planckian locus of e.g. 0.06. In other words, a distance from the Planckian locus is, for example in the range from 800 K to 6500 K, given by Δu'v'≤0.060.

The passive diffuse light generator may comprise a plurality of nanoscale elements embedded in a transparent matrix. The nanoscale elements and the transparent matrix have a difference in the refractive index. That difference in the refractive index, the size distribution of the nanoscale elements embedded in the matrix, and the number of nanoscale elements per unit surface area are, for example, selected such that a transmittance is provided that is larger in the red (in the meaning of longer wavelengths of an incident broad spectrum) than in the blue (in the meaning of shorter wavelengths of an incident broad spectrum). Thus, the passive diffuse light generator is constructed such that it preferentially scatters short-wavelength components of visible incident light with respect to long-wavelength components of visible incident light.

Nanostructure-based Rayleigh-like diffusing material used in the diffuser panel may comprises a solid matrix of a first material (e.g. resins having excellent optical transparency), wherein nanoscattering centers such as nanoparticles or nanodroplets of a second material (organic or inorganic nanoparticles such as ZnO, TiO2, SiO2, Al2O3 and similar or liquid crystal droplets) are dispersed. To achieve the scattering, the refractive indexes of the two materials are different, and this mismatch on the refractive index on the nano-scale is responsible of the Rayleigh-like scattering phenomenon. The absorption of the first and the second material in the visible wavelength range usually can be considered negligible. Moreover, the diffuser panel may be uniform, in the sense that, given any point of the diffuser panel, the physical characteristics of the panel in that point does not depend on the position of that point. An effective diameter d of the nanostructure (nanoscattering centers) falls within the range [5 nm-500 nm], such as [10 nm-350 nm], or even [40 nm-180 nm], or [60 nm-150 nm], where the effective diameter d is the diameter of the equivalent spherical particle, namely the effective diameter spherical particle having similar scattering properties as the aforementioned nanoparticles.

Diameter, refractive index mismatch, and areal density (number per square meter) of the nanoparticles are the parameters that define the cross section of the scattering phenomenon in the diffuse light generator. In addition, the amount of the impinging light scattered from the chromatic panel increases by increasing one of the parameters mentioned above. In order to simplify the description one can consider just the regular transmittance property T(λ) of the material at a certain wavelength. Herein, as defined in the Standard Terminology of Appearance, ASTM international, E 284-09a, the transmittance is in general the ratio of the transmitted flux to the incident flux in the given conditions. The regular transmittance T(λ) is the transmittance under the undiffused angle, i.e. the angle of incidence. In the context of the present disclosure, for a given wavelength and a given position on the Rayleigh-diffuser, the regular transmittance is intended for non-polarized incident light with an incident angle corresponding to the main light beam propagation.

Regarding a transmission configuration, the regular transmittance for the blue T[450 nm] may be in general within the range [0.05-0.9]. In particular in some embodiments aiming at a pure clear sky the range would be [0.3-0.9], such as [0.35-0.85] or even [0.4-0.8]; in the embodiments aiming at a Nordic sky the range would be [0.05-0.3], such as [0.1-0.3] or even [0.15-0.3]. Since the transmittance measurement is a feasible way to evaluate the optical properties of the presented materials, herein this approach is applied similarly to the reflective chromatic stratified panels.

Considering a reflection configuration, the Rayleigh-scatterer is crossed twice by the impinging light (due to the presence of a mirror), in order to obtain comparable transmittance data with respect to the transmission configuration, the mirror aspect has to be removed as will apparent also from the above cited art.

The chromatic effect is further based on the ratio m between the particle and host medium refractive indexes $$\left(\text{with } m \equiv \frac{n_p}{n_h}\right)$$

may be in the range 0.5≤m≤2.5 such as in the range 0.7≤m·2.1 or 0.7≤m≤1.9

The chromatic effect is further based on the number of nanoscattering centers per unit area seen by the impinging light propagating in the given direction as well as the volume-filling-fraction f. The volume filling fraction f is given by $$f = \frac{4}{3}\pi\left(\frac{d}{2}\right)^3 \rho$$

with ρ [meter-3] being the number of particles per unit volume. Filling fractions can cover a large range such as f≤0.4, such as f≤0.1, for solid particles within a matrix or larger values of f for liquid crystal embodiments (f up to 0.7 and more).

The chromatic effect is further based on a number N of nanoscattering centers per unit area of the Rayleigh diffusor in dependence of an effective particle diameter D=d nh. Thereby, d [meter] is the average particle size defined as the average particle diameter in the case of spherical particles, and as the average diameter of volume-to-area equivalent spherical particles in the case of non-spherical particles, as defined in [T. C. GRENFELL, AND S. G. WARREN, "Representation of a non-spherical ice particle by a collection of independent spheres for scattering and absorption of radiation". Journal of Geophysical Research 104, D24, 31,697-31,709. (1999)]. The effective particle diameter is given in meters or, where specified in nm.

In general, any of the following factors may be applied as upper or lower limit, including that value or excluding that value respectively in the term $$\frac{\text{factor}}{D^6} \left| \frac{m^2+2}{m^2-1} \right|^2:$$

| factor (e.g. for Nmin) | factor (e.g. for Nmax) |
|---|---|
| 4.24e−29 | 9.27e−28 (1.04e−27) |
| 8.99e−29 | 6.48e−28 (7.27e−28) |
| 2.79e−28 | 3.69e−28 |
| 3.69e−28 (4.14e−28) | 2.79e−28 |
| 4.85e−28 (5.44e−28) | 2.06e−28 |
| 9.27e−28 (1.04e−27) | 1.21e−27 |
| 9.48e−28 (1.06e−27) | 1.17e−27 (1.31e−27) |
| 9.72e−28 (1.09e−27) | 1.07e−27 (1.20e−27) |

With respect to those physical parameters and their general interplay, it is referred to WO 2009/156348 A1.

As illustrated herein, the scattering aspects are related to a relative refractive index between nanoparticles and a host material. Accordingly, nanoparticles may refer to solid particles as well as optically equivalent liquid or gaseous phase nanoscale elements such as generally liquid or gas phase inclusions (e.g. nanodroplets, nanovoids, nanoinclusion, nanobubbles etc.) having nanometric size and being embedded in the host materials. Exemplary materials that comprise gas phase inclusion (nanovoids/nanopores) in a solid matrix include aerogels that are commonly formed by a 3 dimensional metal oxides (such as silica, alumina, iron oxide) or an organic polymer (e.g. polyacrylates, polystyrenes, polyurethanes, and epoxies) solid framework hosting pores (air/gas inclusions) with dimension in the nanoscale. Exemplary materials that comprise liquid phase inclusions include liquid crystal (LC) phases with nanometric dimensions often referred to as liquid phase including nanodroplets that are confined in a matrix that commonly may have a polymeric nature. In principle, there is a large variety of LCs commercially available, e.g. by Merck KGaA (Germany). Typical classes of liquid crystal may include cyanobiphenyls and fluorinated compounds. Cyanobiphenyls can be mixed with cyanoterphenyls and with various esters. A commercial example of nematic liquid crystals belonging to this class is "E7" (Licrilite® BLOO1 from Merck KGaA). Furthermore, liquid crystals such as TOTN404 and ROTN-570 are available from other companies such as Hoffman-LaRoche, Switzerland.

With respect to LC, an anisotropy in refractive index may be present. This may allow to use liquid crystal droplets dispersed in a solid transparent host material as scattering particles in a nanosize range (e.g. for Rayleigh-like scattering). Specifically, one can set a contributing relative index of refraction by changing a voltage applied across the liquid crystal droplets, e.g. using a sandwich structure of an polymer dispersed liquid crystal (PDLC) layer provided in between electrical contacts (such as ITO PET films or ITO glass sheets) in a sandwich structure and applying a voltage across the PDLC layer using a power source. Specifically, creating an electric field aligns the liquid crystal orientations within distinct nanodroplets to some extent. For further details, it is referred to the international patent application entitled "TUNABILITY IN SUN-LIGHT IMITATING LIGHTING SYSTEMS", filed on the same day herewith by the same applicants, which is incorporated by reference herein.

Although, herein the Rayleigh-like scattering is primarily disclosed in connection with panel structures, in view of the cited disclosures, it is apparent that also other configuration such as film, coating, sandwich structures can apply in a planar or curved, transmitting or reflecting manner.

While in the exemplary embodiments above, it was referred to illumination system such as illumination system using natural and optionally artificially generated light, the herein disclosed concepts also address a sunlight-based projector system that uses a chromaticity based control system to maintain in particular the appearance of the collected light beam as well as the appearance of an illumination based on such a projector system.

For completeness, the skilled person will associate the following features to the respective embodiments disclosed above.

The sunlight forming unit may comprises an absorber system made of light-absorbing material arranged such that the light-emitting face has a total reflectance factor of about or less 0.4 wherein the total reflectance factor $\eta_r$ is defined as the ratio of the luminous flux, reflected at all angles within the hemisphere bounded by the plane of the specimen, to the flux reflected from a perfect reflecting diffuser under the same geometric and spectral conditions of measurement under diffuse illumination by a D65 standard illuminant which provides uniform illuminance onto the sample, thereby in particular being configured to substantially absorb light rays that cross the light-emitting face in an upstream direction and that, in the absence of the absorber system, would not be directed toward a fiber output channel.

The sunlight forming unit may be configured such that the direct light beam has a luminous intensity distribution characterized by a narrow peak having a full width half maximum of about or below 20°, such as 10° or less, or 5° or less, in at least one direction orthogonal to the main propagation direction of the direct light beam.

The luminous intensity distribution of the direct light beam may be optionally characterized by a high contrast between a central area characterized essentially by light propagation alone the main propagation direction that is defined by the narrow peak and has a high and essentially constant intensity, and surrounding area that is outside the narrow peak and has a luminous intensity that, at a distance from the center of the narrow peak of about the full width half maximum, is reduced to at the most 0.01 such as 0.001 or even 0.0001 of the average intensity in the narrow peak.

At least one of the plurality of sunlight balancing light sources may be controllable by the control unit in dependence of the chromaticity and/or the amount of the collected light by the collector system and inferred from information provided by the sensor unit.

The sunlight balancing light source may be further controllable to stabilize the total amount of light provided by the projector system and/or to stabilize the color appearance of the diffuse light component and/or the direct light component.

The sunlight forming unit may be configured for being installed to illuminate an indoor ambience of a building such as a room or a hall, e.g. by being installed in a ceiling or wall of the room or the hall.

It will further be appreciated that two or more fiber output ends and/or two or more artificial light generating sources may provide light to a collimator unit.

Although the preferred embodiments of this invention have been described herein, improvements and modifications may be incorporated without departing from the scope of the following claims.

The invention claimed is:

1. A sunlight-based projector system for providing a direct light beam, the sunlight-based projector system comprising:
 a sunlight receiving unit with a collector system, a plurality of optical fibers, and a plurality of fiber output channels, wherein the collector system is configured for collecting natural outdoor light, and for coupling the collected natural outdoor light having a broad wavelength spectrum of sunlight into each optical fiber in the plurality of optical fibers, wherein each of the plurality of optical fibers comprises a fiber output end, and each fiber output channel comprises at least one fiber output end from which divergent fiber output light corresponding to the collected natural outdoor light having the broad wavelength spectrum of sunlight is emitted, and
 a sunlight forming unit with a plurality of optical collimator units arranged in a one- or a two-dimensional array,
 wherein
 each optical collimator unit is associated with a respective fiber output channel to receive the respective fiber output light and each optical collimator unit comprises at least one optical collimator configured to reduce the angular distribution width of the received divergent fiber output light, and
 output areas of the plurality of optical collimator units form essentially a continuously extending large light-emitting face of the sunlight forming unit for emitting an essentially collimated light beam.

2. The sunlight-based projector system of claim 1, wherein fiber output ends associated to a common fiber output channel are located essentially next to each other, such that the light output from respective fiber output ends is input to a single associated optical collimator unit.

3. The sunlight-based projector system of claim 1, wherein each optical collimator unit comprises a light collimator or refractive and/or reflective optics.

4. The sunlight-based projector system of claim 3, wherein the light collimator is a lens or a conventional converging lens, or a converging Fresnel lens, which is located at a distance from the respective fiber output end of about a focal length of the lens.

5. The sunlight-based projector system of claim 3, wherein each optical collimator unit further comprises a field lens as a primary converging element being positioned next to the respective fiber output end and receiving the fiber output light of the respective fiber output channel, and the collimator element is a lens located at a distance from the respective fiber end less than the focal length of the lens.

6. The sunlight-based projector system of claim 3, wherein light collimators of neighboring optical collimator units transition into each other or form a single optical element or a multi-lenses element.

7. The sunlight-based projector system of claim 1, wherein, in the one- or two-dimensional array, at least a subgroup of the fiber output channels are essentially equally spaced and/or wherein at least a subgroup of the optical collimator units are essentially equally spaced.

8. The sunlight-based projector system of claim 1, wherein an output area of an optical collimator unit is in the range from 0.2 cm$^2$ to 200 cm$^2$; and/or
 wherein output areas of neighboring optical collimator units abut against each other or are spaced apart by an intermediate area with a width of less than 50% of the maximum dimension of the optical collimator units.

9. The sunlight-based projector system of claim 1, wherein the sunlight forming unit further comprises a spatial homogenizing unit comprising an array of homogenization elements extending downstream of the collector system.

10. The sunlight-based projector system of claim 9, wherein each homogenization element has a transversal size in the range from 5 mm to 0.1 mm.

11. The sunlight-based projector system of claim 9, wherein the spatial homogenizing unit is upstream the light-emitting face and is configured to produce a homogenization of the light intensity distribution inside the divergence boundaries and/or at the near field of the direct light beam provided by the sunlight forming unit.

12. The sunlight-based projector system of claim 1, wherein the sunlight forming unit further comprises an absorber system made of light-absorbing material arranged such that the light-emitting face has a total reflectance factor of about or less 0.4, wherein the total reflectance factor $\eta_r$ is defined as the ratio of the luminous flux, reflected at all angles within the hemisphere bounded by the plane of the specimen, to the flux reflected from a perfect reflecting diffuser under the same geometric and spectral conditions of measurement under diffuse illumination by a D65 standard illuminant which provides uniform illuminance onto the sample, thereby being configured to substantially absorb light rays that cross the light-emitting face in an upstream direction and that, in the absence of the absorber system, would not be directed toward a fiber output channel, and/or
 wherein the absorber system comprises laterally arranged absorbing surfaces that extend in-between neighboring optical collimator units.

13. The sunlight-based projector system of claim 1, wherein the sunlight forming unit is configured such that the direct light beam has a luminous intensity distribution characterized by a narrow peak having a full width half maximum of about or below 20°, in at least one direction orthogonal to the main propagation direction of the direct light beam, and/or
 wherein the luminous intensity distribution of the direct light beam is characterized by a high contrast between a central area characterized essentially by light propagation along the main propagation direction that is defined by the narrow peak and has a high and essentially constant intensity, and surrounding area that is outside the narrow peak and has a luminous intensity that, at a distance from the center of the narrow peak of about the full width half maximum, is reduced to at the most 0.01 of the average intensity in the narrow peak.

14. The sunlight-based projector system of claim 1, wherein the projector system further comprises
 a control unit and
 at least one sensor unit configured to provide information on the luminance, the illuminance, the chromaticity of the collected natural outdoor light, and/or the collected light provided to the sunlight forming unit, and at least one of the direct light beam, the diffuse light component, and the direct light component to the control unit.

15. The sunlight-based projector system of claim 14,
wherein the control unit provides control signals in dependence of the received information to at least one light shutter, at least one chromatic filter, and/or at least one of a supporting light source and sunlight balancing light sources, and/or
wherein the control unit comprises a compensation protocol for feedback-based controlling of at least one light shutter, at least one chromatic filter, and/or at least one of the supporting light source and the sunlight balancing light sources according to a compensation protocol.

16. The sunlight-based projector system of claim 1, wherein the projector system further comprises a plurality of sunlight balancing light sources configured to emit light into the optical path of the collected light collected by the collector system.

17. The sunlight-based projector system of claim 16,
wherein at least one of the plurality of sunlight balancing light sources is configured for coupling light into the plurality of optical fibers; or
wherein at least one of the plurality of sunlight balancing light sources is configured for coupling light into one of the plurality of optical collimator units.

18. The sunlight-based projector system of claim 17, wherein at least one of the plurality of sunlight balancing light sources is positioned with its light output region next to a fiber output end and/or wherein the divergence of the light emitted by the sunlight balancing light source is comparable to the divergence of the light emitted from a fiber output end.

19. The sunlight-based projector system of claim 16, wherein at least one of:
at least one of the plurality of sunlight balancing light sources is controllable by the control unit in dependence of the chromaticity and/or the amount of the collected light by the collector system and inferred from information provided by the sensor unit; and
at least one of the plurality of sunlight balancing light sources is controllable to stabilize the total amount of light provided by the projector system and/or to stabilize the color appearance of the diffuse light component and/or the direct light component.

20. The sunlight-based projector system of claim 1, wherein the projector system further comprises at least one shutter element configured to block sunlight prior to the coupling into at least one of the plurality of optical fibers or downstream of the fiber output end, and/or
wherein the shutter element is controllable to stabilize the total amount of sunlight provided to the sunlight forming unit.

21. The sunlight-based projector system of claim 1, wherein the projector system further comprises at least one chromatic filter configured to attenuate sunlight based on the wavelength of the sunlight prior to the coupling into at least one of the plurality of optical fibers or downstream of the fiber output end.

22. A sunlight-based projector system for providing a direct light beam, the sunlight-based projector system comprising:
a sunlight receiving unit with a collector system, a plurality of optical fibers, and a plurality of fiber output channels, wherein the collector system is configured for collecting natural outdoor light, and for coupling the collected light into the plurality of optical fibers, wherein each of the plurality of optical fibers comprises a fiber output end, and each fiber output channel comprises at least one fiber output end from which divergent fiber output light is emitted, and
a sunlight forming unit with a plurality of optical collimator units arranged in a one- or a two-dimensional array,
wherein:
each optical collimator unit is associated with a respective fiber output channel to receive the respective fiber output light and comprises at least one optical collimator configured to reduce the angular distribution width of the received divergent fiber output light,
output areas of the plurality of optical collimator units form essentially a continuously extending large light-emitting face of the sunlight forming unit for emitting an essentially collimated light beam; and
neighboring optical collimator units are separated by an absorber structure made of light-absorbing material to ensure that essentially only light from the associated fiber output channel is emitted from an output area of the respective optical collimator unit.

23. A sunlight-based projector system for providing a direct light beam, the sunlight-based projector system comprising:
a sunlight receiving unit with a collector system, a plurality of optical fibers, and a plurality of fiber output channels, wherein the collector system is configured for collecting natural outdoor light, and for coupling the collected light into the plurality of optical fibers, wherein each of the plurality of optical fibers comprises a fiber output end, and each fiber output channel comprises at least one fiber output end from which divergent fiber output light is emitted, and
a sunlight forming unit with a plurality of optical collimator units arranged in a one- or a two-dimensional array,
wherein:
each optical collimator unit is associated with a respective fiber output channel to receive the respective fiber output light and comprises at least one optical collimator configured to reduce the angular distribution width of the received divergent fiber output light,
output areas of the plurality of optical collimator units form essentially a continuously extending large light-emitting face of the sunlight forming unit for emitting an essentially collimated light beam; and
the continuous light-emitting face comprises non-emitting transition areas between output areas of neighboring optical collimator units and the non-emitting transition areas cover at the most 60% of the continuous light-emitting face and/or an extent of a non-emitting transition area between output areas of neighboring optical collimator units is at the most 0.5 times the maximum lateral size of an output area.

24. An illumination system for generating a sun-like appearance within a sun-sky imitating illumination system, the illumination system comprising:
a sunlight-based projector system configured to generate a direct light component based on a direct light beam, the sunlight-based projector system comprising:
a sunlight receiving unit with a collector system, a plurality of optical fibers, and a plurality of fiber output channels, wherein the collector system is configured for collecting natural outdoor light, and for coupling the collected light into the plurality of optical fibers, wherein each of the plurality of optical fibers comprises a fiber output end, and each fiber output channel comprises at least one fiber output end from which divergent fiber output light is emitted, and a sunlight forming unit with a plurality of optical collimator units arranged in a one- or a two-dimensional array, each optical collimator unit being associated with a respective fiber output channel to receive the respective fiber output light and each optical collimator unit comprising at least one optical collimator configured to reduce the angular distribution width of the received divergent fiber output light, wherein output areas of the plurality of optical collimator units form essentially a continuously extending large light-emitting face of the sunlight forming unit for emitting an essentially collimated light beam;

and a diffuse light generating unit configured to generate a diffuse light component emitted across the direct light beam, wherein at least one of:

the diffuse light generating unit comprises a Rayleigh-like scattering unit extending across the direct light beam that is configured to scatter more efficiently shorter wavelength light than longer wavelength light such that a portion of the direct light beam is diffuse emitted with essentially a Lambertian luminous intensity distribution;

the diffuse light generating unit extends across the collimated light beam provided by the projector system and emits diffuse light with a FWHM of at least 3, 5, or 10 times the FWHM of the light beam; and the diffuse light generating unit comprises a light guide panel and at least one supporting light source for coupling light into the light guide panel and at least one decoupling element that is configured to extract light uniformly out of the light guide panel.

25. The illumination system of claim 24, wherein the directional light component has a first correlated color temperature, wherein the direct light from a specific location of is emitted with a directed angular luminous intensity distribution with a local peak, which defines a local main direction of direct light emitted from that specific location; and the diffuse light component has a second correlated color temperature, which is larger than the first correlated color temperature, wherein the diffuse light is emitted for a specific location with a diffuse angular luminous intensity distribution; and/or wherein the direct light component has a correlated color temperature which is lower than a correlated color temperature of the diffused light component (37) by a factor at least 1.2.

26. A sunlight-based projector system for providing a direct light beam usable for generating a sun-like appearance within a large area light output side of a sunlight-based illumination system, the sunlight-based projector system comprising:

a sunlight receiving unit with a collector system and a plurality of optical fibers, wherein the collector system is configured to collect natural outdoor light, and to couple the collected natural outdoor light having a broad wavelength spectrum of sunlight into each of the optical fibers in the plurality of optical fibers, an active light source unit configured to complement the collected natural outdoor light with artificially generated light, a sunlight forming unit with at least one optical collimator unit, wherein each optical collimator unit is associated with at least one optical fiber and receives collected natural outdoor light emitted from the plurality of optical fibers and having the broad wavelength spectrum of sunlight and artificially generated light, and provides, based on the natural light and the artificially generated light, a collimated light beam, and a chromaticity based control system comprising a chromaticity sensor configured to detect the chromaticity of the collected natural outdoor light and/or the emitted collimated light, and a control unit configured to control the active light source unit in response to the detected chromaticity.

27. The sunlight-based projector system of claim 26, wherein the chromaticity based control system further comprises a flux sensor configured to detect the flux of the collected natural outdoor light and/or the emitted collimated light, and the control unit is configured to control the active light source unit in response to the detected flux.

28. A sunlight-based projector system for providing a direct light beam usable for generating a sun-like appearance within a large area light output side of a sunlight-based illumination system, the sunlight-based projector system comprising:

a sunlight receiving unit with a collector system and a plurality of optical fibers, wherein the collector system is configured to collect natural outdoor light, and to couple the collected natural outdoor light into the plurality of optical fibers, an active light source unit configured to complement the collected natural outdoor light with artificially generated light, wherein the active light source unit comprises a sunlight balancing light source configured to couple artificially generated light into an optical fiber that then follows a common optical path with the collected natural outdoor light and/or into an optical collimator unit to follow a common optical path with the collected natural outdoor light, a sunlight forming unit with at least one optical collimator unit, wherein each optical collimator unit is associated with at least one optical fiber and receives collected natural outdoor light emitted from the plurality of optical fibers and artificially generated light, and provides, based on the natural light and the artificially generated light, a collimated light beam, and a chromaticity based control system comprising a chromaticity sensor configured to detect the chromaticity of the collected natural outdoor light and/or the emitted collimated light, and a control unit configured to control the active light source unit in response to the detected chromaticity.

\* \* \* \* \*